(12) United States Patent
Shin et al.

(10) Patent No.: US 12,264,907 B2
(45) Date of Patent: Apr. 1, 2025

(54) DEVICE AND METHOD FOR MEASURING HEIGHT

(71) Applicant: MAGPIE TECH INC., Seoul (KR)

(72) Inventors: Ung Chul Shin, Incheon (KR); Hyun Mi Choi, Seoul (KR); Young Seun Chae, Suwon-si (KR); Tae Ryang Kwon, Daejeon (KR); Jung Han Yoo, Seoul (KR); Sung Wook Youn, Seoul (KR); Young Ju Jung, Seoul (KR)

(73) Assignee: MAGPIE TECH INC., Seoul (KR)

( * ) Notice: Subject to any disclaimer, the term of this patent is extended or adjusted under 35 U.S.C. 154(b) by 256 days.

(21) Appl. No.: 17/957,104

(22) Filed: Sep. 30, 2022

(65) Prior Publication Data

US 2023/0194241 A1 Jun. 22, 2023

(30) Foreign Application Priority Data

Dec. 20, 2021 (KR) .......................... 10-2021-0183112

(51) Int. Cl.
*G01B 11/06* (2006.01)
*G01C 15/00* (2006.01)

(52) U.S. Cl.
CPC ........ *G01B 11/0608* (2013.01); *G01C 15/008* (2013.01)

(58) Field of Classification Search
CPC . G01B 11/0608; G01C 15/008; A61B 5/1072; A61B 5/1075
See application file for complete search history.

(56) References Cited

U.S. PATENT DOCUMENTS

| 4,518,052 A | * | 5/1985 | Chen | G01G 19/50 |
| | | | | 250/202 |
| 9,964,400 B1 | * | 5/2018 | Jones | G01B 5/061 |
| 2017/0241770 A1 | * | 8/2017 | Barr | A01K 29/00 |
| 2019/0183386 A1 | * | 6/2019 | Johnston | A61B 5/6829 |

FOREIGN PATENT DOCUMENTS

| CN | 102451007 A | * | 5/2012 |
| CN | 202372244 U | * | 8/2012 |
| KR | 20060131102 A | * | 12/2006 |
| KR | 10-2016-0047826 A | | 5/2016 |
| KR | 10-2017-0087311 A | | 7/2017 |
| KR | 10-2019-0109001 A | | 9/2019 |
| KR | 10-2020-0016611 A | | 2/2020 |
| KR | 10-2021-0093754 A | | 7/2021 |

OTHER PUBLICATIONS

Office Action issued Nov. 24, 2023 issued for the Korean Patent Application No. 10-2021-0183112.
Search Report issued Mar. 17, 2023 for counterpart International Patent Application No. PCT/KR2022/013314.

* cited by examiner

*Primary Examiner* — Octavia Hollington

(57) ABSTRACT

A device for measuring a height includes an inclined portion including a display, a bottom portion connected to the inclined portion, a support vertically connected to the bottom portion, and a laser device disposed in a region where the inclined portion and the support meet each other, the inclined portion, the bottom portion, and the support are connected to each other based on a shape of a right triangle when viewed from a side, the bottom portion includes a support plate for covering the bottom portion, and a switch is included between the bottom portion and the support plate.

12 Claims, 27 Drawing Sheets

Original = Calculated value before angle correction (in MM)
Reference = Reference distance (initial set value) (in MM)
Distance = A measurement distance between a top of a head and a ceiling (a unit of MM)

Final corrected value

X = Inclined angle of product from vertical direction

Y = : Inclined angle of product in left and right direction

DEVICE AND METHOD FOR MEASURING HEIGHT

Pursuant to 35 U.S.C. § 119(a), this application claims the benefit of Korean Patent Application No. 10-2021-0183112, filed on Dec. 20, 2021, which is hereby incorporated by reference as if fully set forth herein.

BACKGROUND

Field

The present disclosure relates to a device and a method for measuring a height.

Discussion of the Related Art

A person does not grow anymore when the person reaches a certain age and a growth plate of a bone closes, so that appropriate management at a time of growth is important. As a result, a growth clinic that professionally manages a growth of a child has been created, but the reality is that regular visits are difficult due to a high cost of treatment.

A height measuring device is a device in which a right-angled pole marked with a measuring scale to measure a height exists on a footrest and a bar disposed perpendicular to the pole is attached to the pole. A position value of a top of a head may be acquired as the bar disposed perpendicular to the pole moves in a vertical direction and may be used as a height value.

Recently, in order to conveniently measure the height at home or at a desired place, portable products utilizing an ultrasonic distance measurement technology are being commercialized. However, unlike a laser sensor, which generates an error in mm, an ultrasonic sensor generates an error in cm, which reduces reliability. In addition, the ultrasonic sensor has a problem that accuracy is lowered because the ultrasonic sensor is also affected by a surrounding structure.

The background has been written to make the present disclosure easier to understand. It should not be construed as an admission that the matters described in the background exist as prior art.

SUMMARY

Accordingly, there is a need for a device that may easily and accurately measure a person's height using a laser distance measurement technology capable of accurately measuring a distance to a target without being affected by a surrounding environment.

Accordingly, the inventors of the present disclosure tried to develop a device that has a button for measuring a distance indoors on a bottom face of the device, and allows a user to measure a height thereof by himself/herself by pressing the included button with a head thereof, and at the same time, irradiating a laser beam to a ceiling.

As a result, the inventors of the present disclosure tried to develop a device that may increase reliability of the measured height by correcting an error that occurs as an irradiation direction of the laser beam is tilted in the process of measuring the height by the user himself/herself.

In addition, the inventors of the present disclosure finally developed a growth management method that measures the height of the user via the height measuring device, and provides a method for managing health during a growth period to the user based on the measured information.

The tasks of the present disclosure are not limited to the tasks mentioned above, and other tasks not mentioned will be clearly understood by those skilled in the art from the description below.

Provided is a smart height measuring device according to an embodiment of the present disclosure in order to solve the problems as described above. The device as a device for calculating a vertical dimension of an object includes: a body including a bottom portion with which the device is to be seated; a power supply disposed inside the body so as to supply power; distance measuring means for measuring a vertical distance between the object and a structure existing in a region upwardly of the object; and a controller for determining the vertical dimension of the object by subtracting the vertical distance from a reference distance.

According to a feature of the present disclosure, the controller may seat the body on a floor where the object is disposed, measure a vertical distance to a bottom face of the structure, and set the measured vertical distance as the reference distance.

According to another feature of the present disclosure, the reference distance may be a vertical distance from a floor surface on which the object is disposed to the bottom face of the structure, and the controller may subtract a vertical length of the device together with the vertical distance from the reference distance and determine the subtracted value as the vertical dimension of the object.

According to another feature of the present disclosure, a button for sensing a user input may be further included.

According to another feature of the present disclosure, when the user input is sensed for a preset time via the button, the controller may measure a distance from the bottom face of the structure to a top face of the object multiple times and individually subtract the distances measured multiple times from the reference distance to determine an average value of the subtracted values as the vertical dimension of the object.

According to another feature of the present disclosure, the controller may correct the determined vertical dimension based on [Mathematical Equation 1] below.

$$A = A' \times \cos x \times \cos y - k \sin x \qquad \text{[Mathematical Equation 1]}$$

Here, A' refers to a distance calculated when the device itself is not properly seated on the floor, x refers to an angle of inclination of the device in a front and rear direction, y refers to an angle of inclination of the device in a left and right direction, k refers to a distance from a measurement reference floor surface to a center of a bottom face of the device, and A refers to a vertical distance corrected via the above-described variables and constants.

According to another feature of the present disclosure, the smart height measuring device may have a cross-section of the body viewed from a side in a form of a triangle, the button for sensing the user input may be disposed at a plane with a base of the triangle, and an irradiation direction of a laser beam may be parallel to a height direction of the triangle.

According to another feature of the present disclosure, after the providing, transmitting the determined vertical dimension to a height management server and receiving data for growth management from the height management server may be further included.

Specific details of other embodiments are included in the detailed description and drawings.

According to the present disclosure, as the laser beam irradiation button is disposed on the bottom face of the device, the device may be operated just by placing the device on the head, so that the user may accurately measure the height thereof by himself/herself without the help of others.

In addition, according to the present disclosure, the error that occurs as the irradiation direction of the laser beam is tilted in the process of measuring the height via the device may be corrected, so that the measured height is reliable.

In addition, according to the present disclosure, the height of the user measured via the device may be automatically recorded, and the management method for the growth period based on the recorded height may be provided to the user, so that the user may enjoy services such as one-on-one consulting provided by a growth management expert. In addition, businesses that provide the height measurement and growth management services may secure height data from infants to adolescents.

The effects according to the present disclosure are not limited by the contents illustrated above, and more various effects are included in the present disclosure.

Figure 3A:
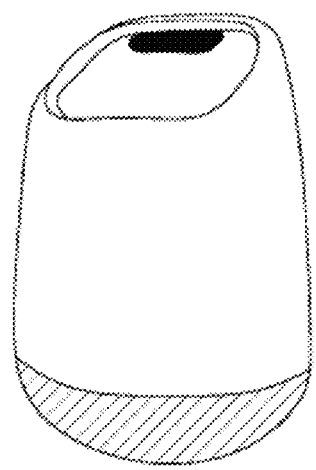
Figure 3B:
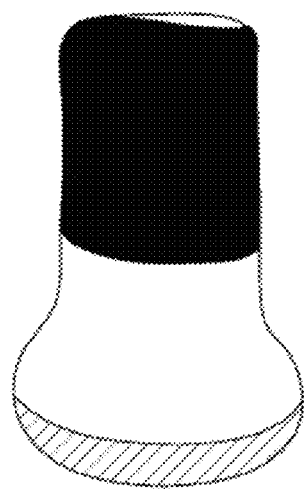
Figure 3C:
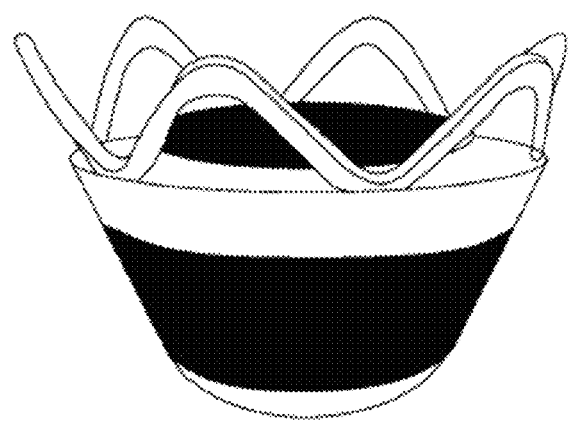

(a) to (c) in FIG. 3 are schematic diagrams illustratively showing smart height measuring devices according to other embodiments of the present disclosure.

Figure 4:
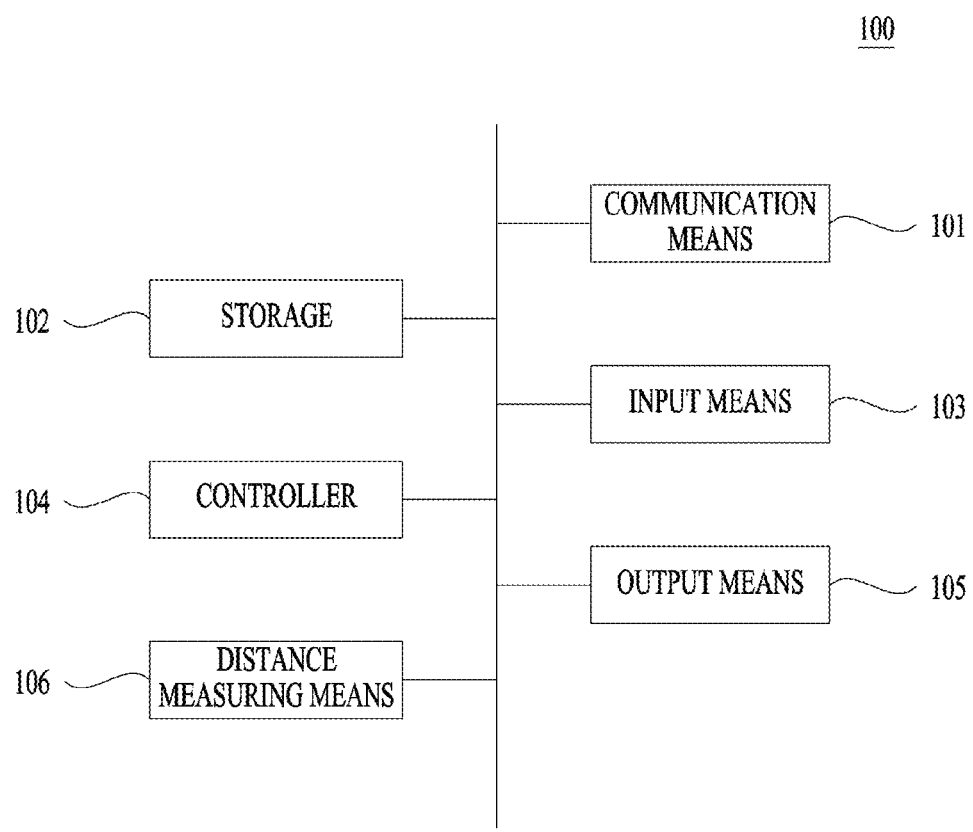

FIG. 4 is a block diagram showing a configuration of a smart height measuring device according to an embodiment of the present disclosure.

Figure 5A:
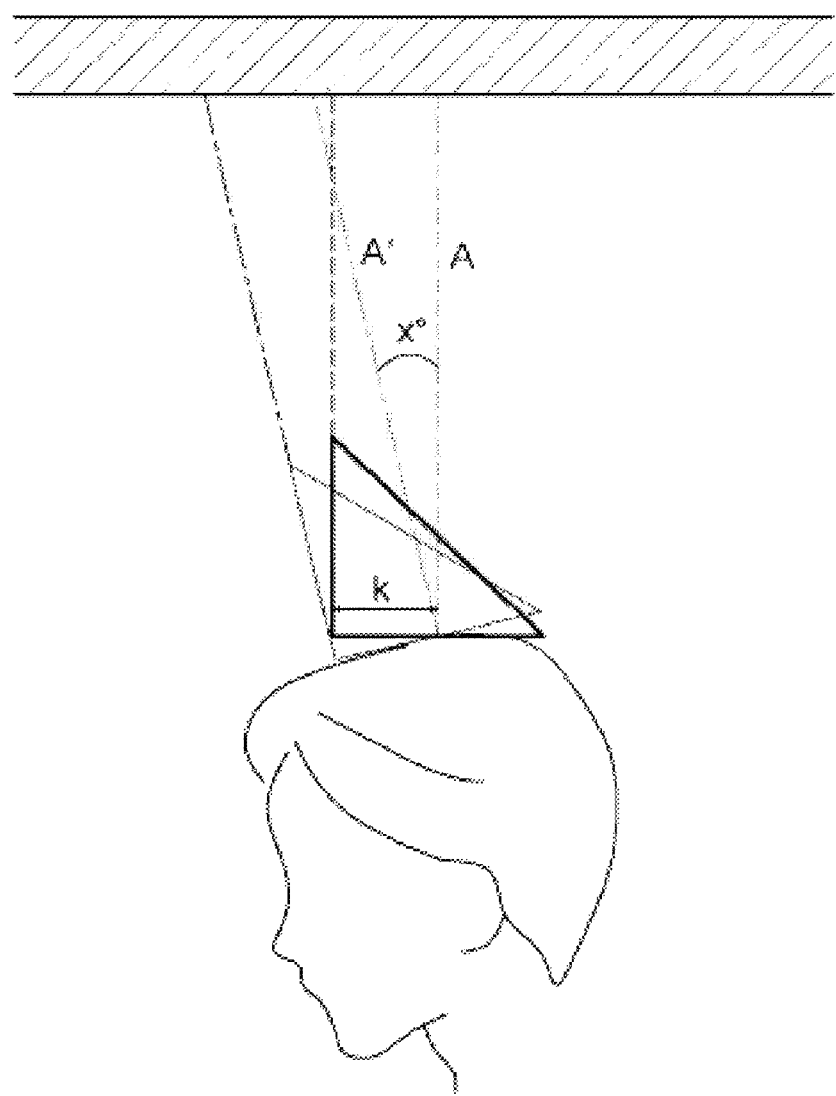
Figure 5B:
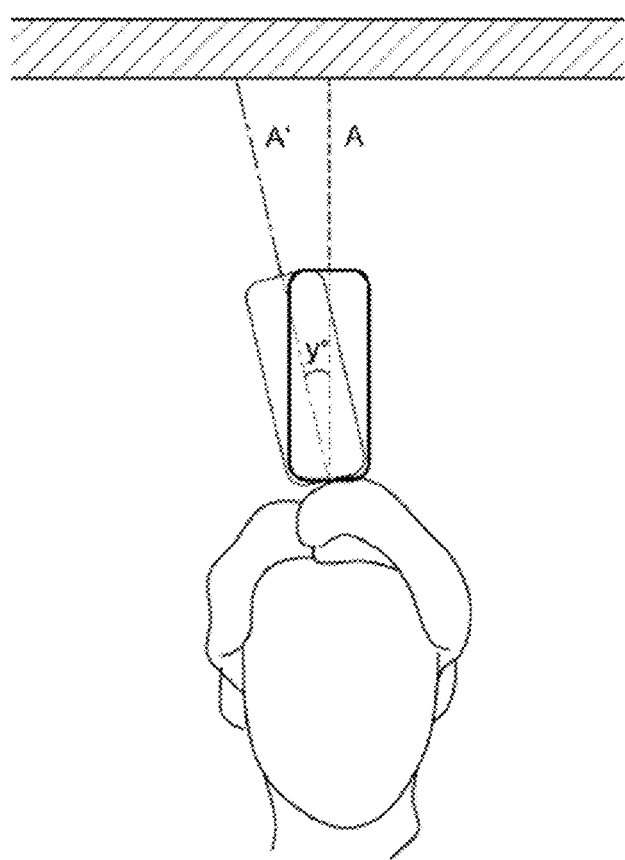

(a) to (b) in FIG. 5 are schematic diagrams for illustrating a scheme for measuring a vertical distance by a smart height measuring device according to an embodiment of the present disclosure.

Figure 6:
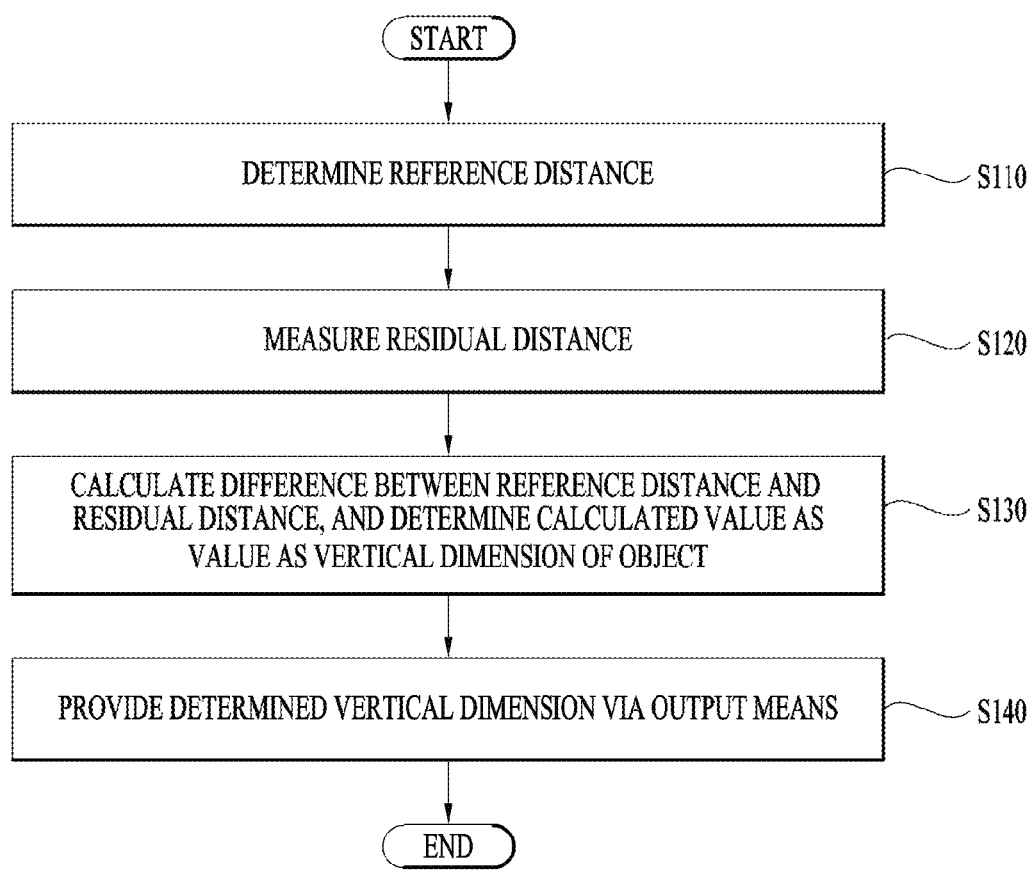

FIG. 6 is a schematic flowchart of a growth management method according to an embodiment of the present disclosure.

Figure 7:
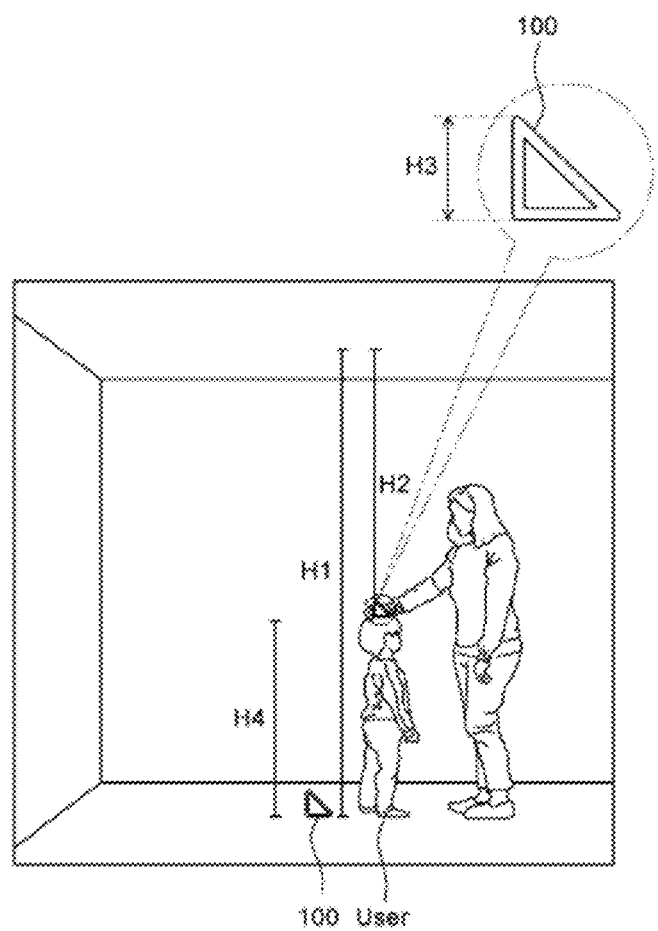

FIG. 7 is a schematic diagram for illustrating a height measurement scheme of a smart height measuring device according to an embodiment of the present disclosure.

Figure 8:
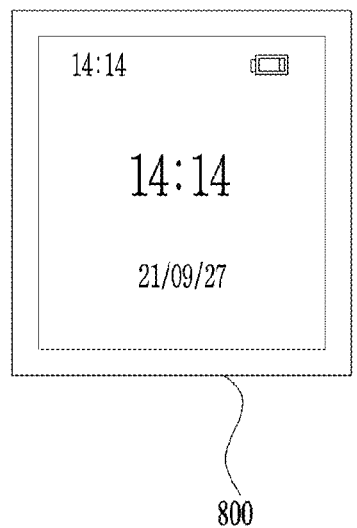

FIG. 8 shows a height measuring device according to embodiments.

Figure 9:
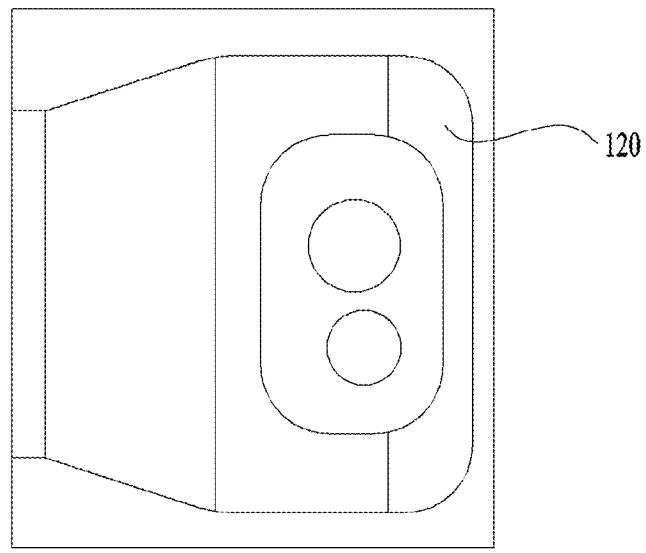

FIG. 9 shows a height measuring device according to embodiments.

Figure 10:
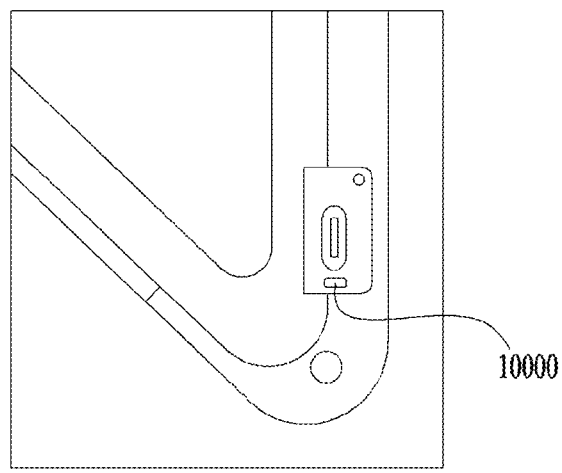
Figure 10:
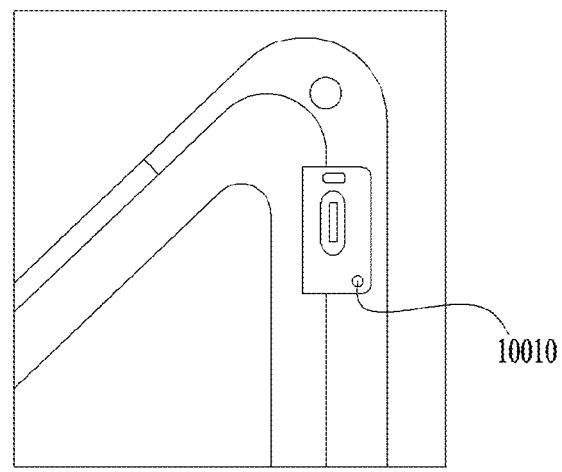

FIG. 10 shows a height measuring device according to embodiments.

Figure 11:
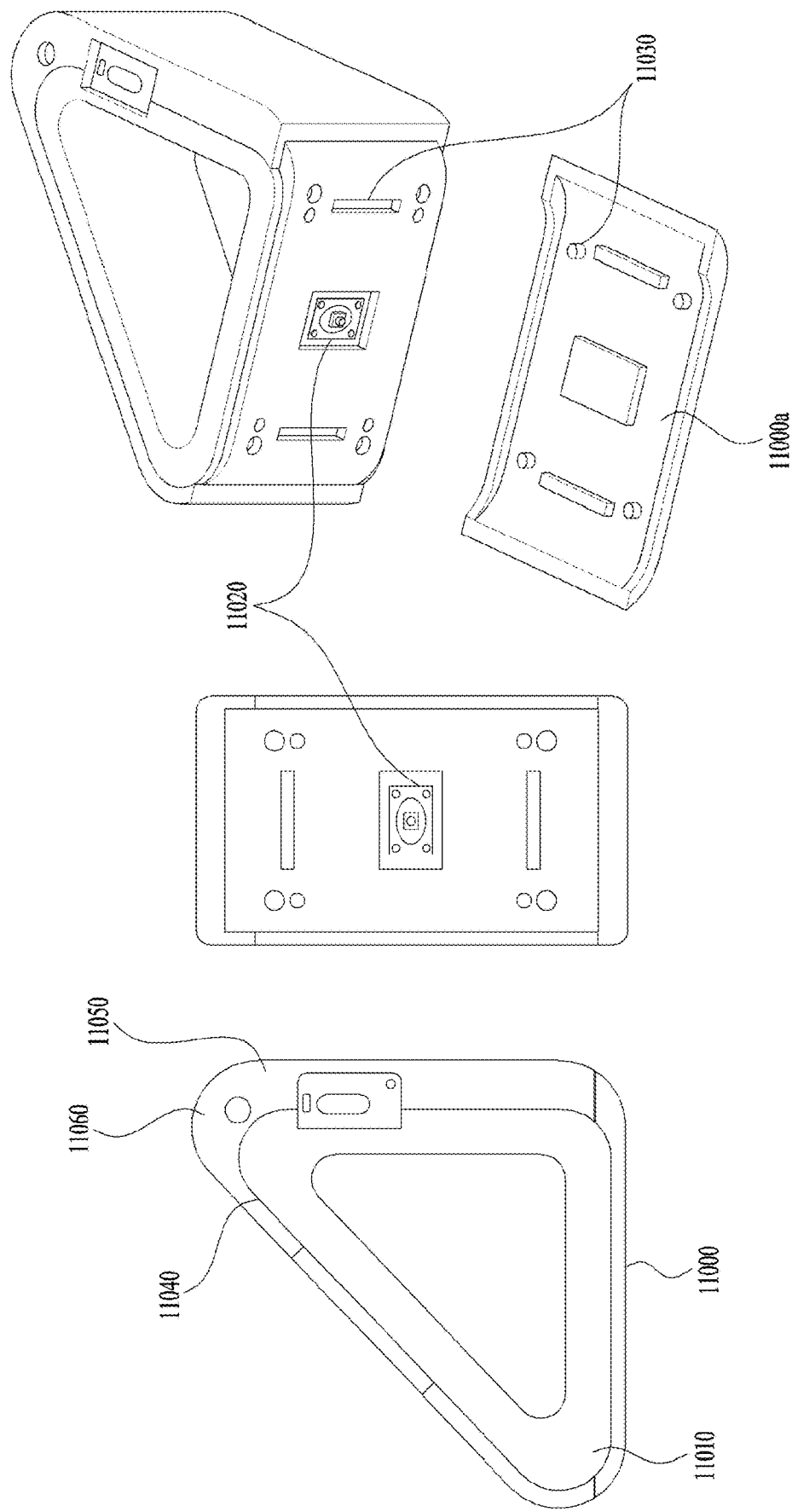

FIG. 11 shows a height measuring device according to embodiments.

Figure 12:
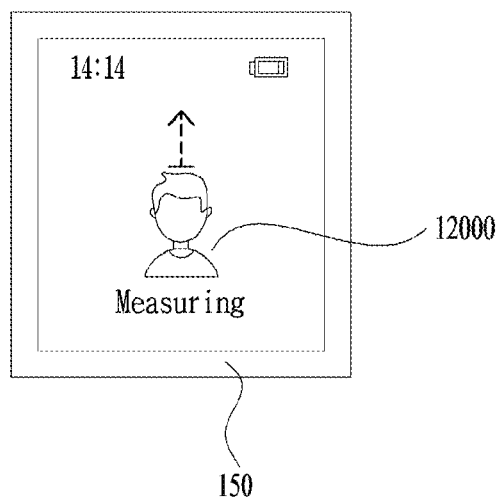

FIG. 12 shows output means of a height measuring device according to embodiments.

Figure 13:
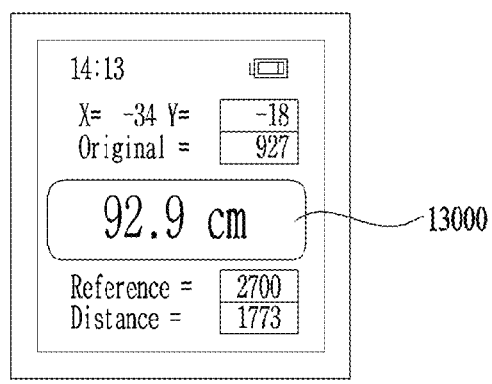

FIG. 13 shows output means of a height measuring device according to embodiments.

Figure 14:
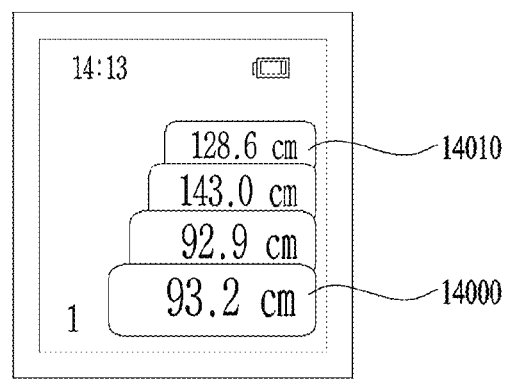

FIG. 14 shows data recording of a height measuring device according to embodiments.

Figure 15:
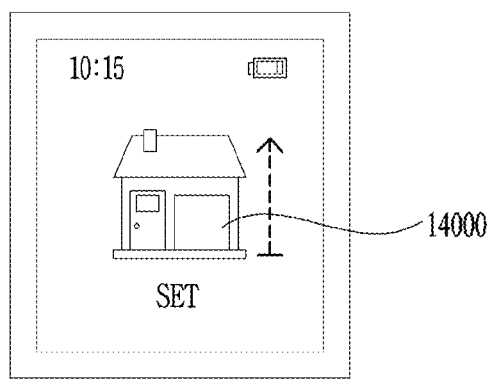

FIG. 15 shows an example of a measurement of a reference distance of a height measuring device according to embodiments.

Figure 16:
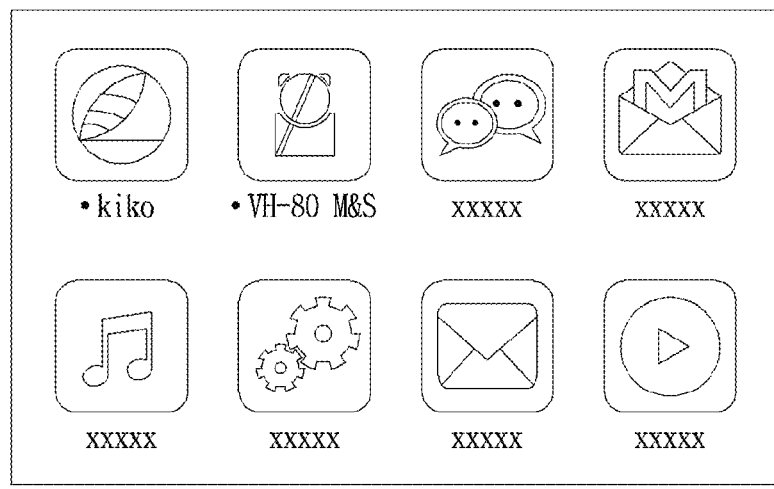

FIG. 16 is an example of a user interface according to embodiments.

Figure 17:
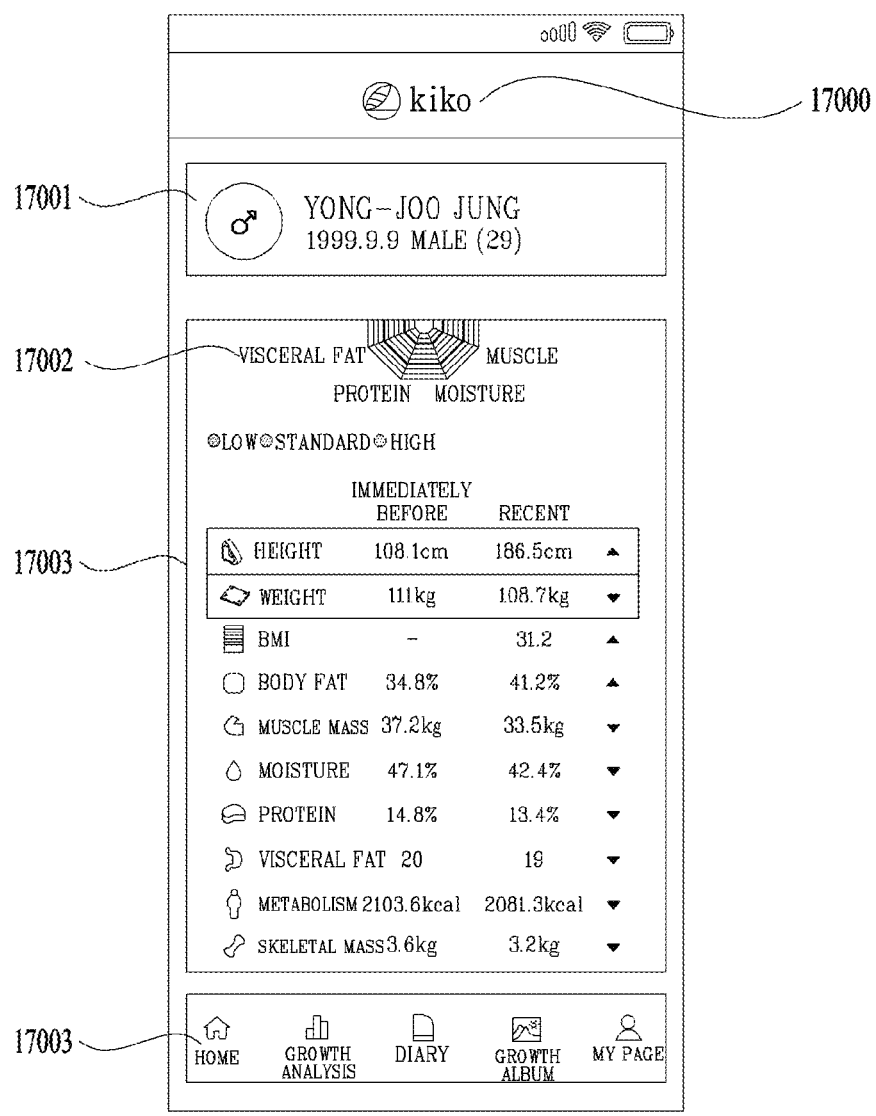

FIG. 17 shows a configuration for displaying data related to a height measuring device according to embodiments.

Figure 18:
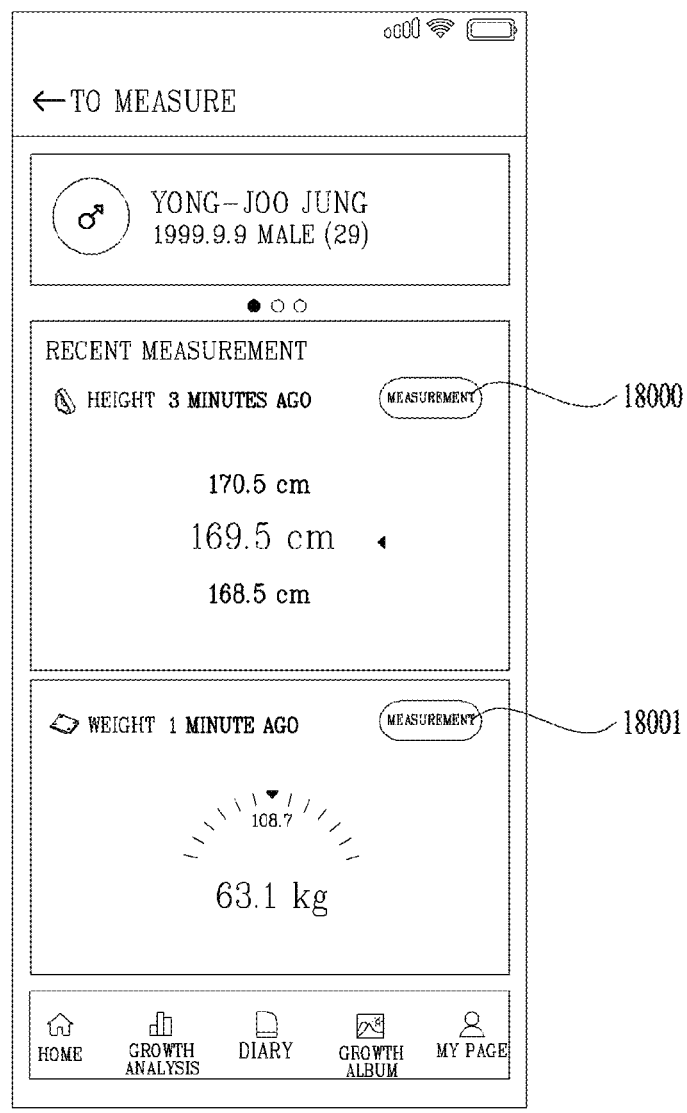

FIG. 18 shows a configuration for displaying data related to a height measuring device according to embodiments.

Figure 19:
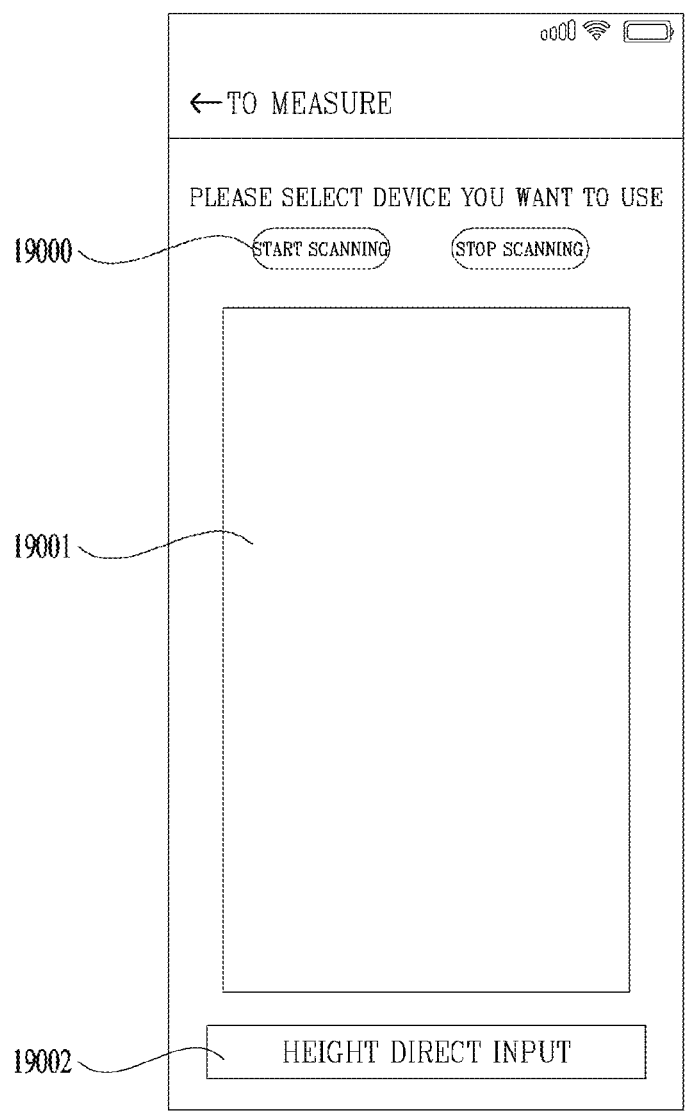

FIG. 19 shows display of information related to a measuring operation of a height measuring device according to embodiments.

Figure 20:
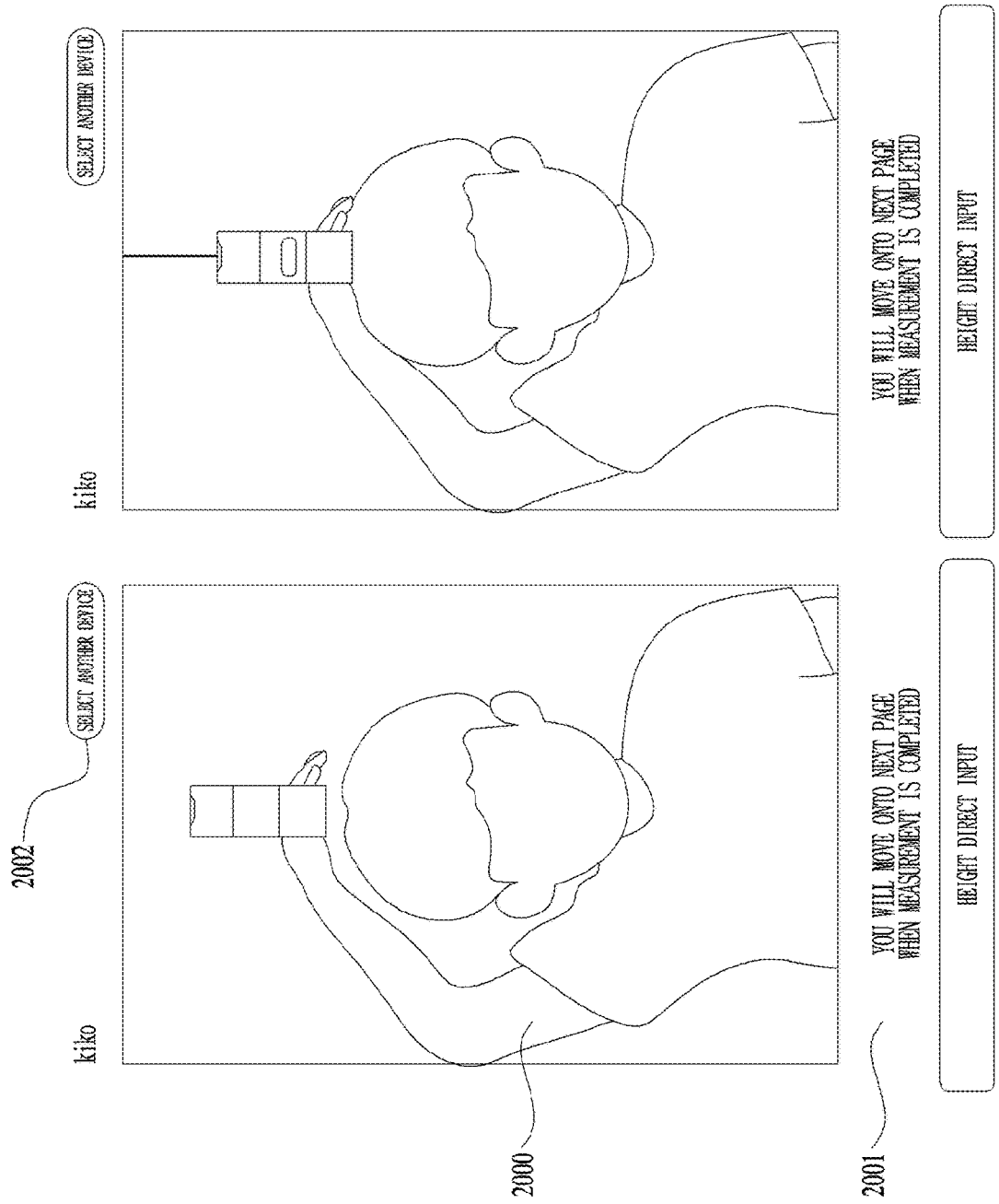

FIG. 20 shows an example of a height measurement guide according to embodiments.

Figure 21:
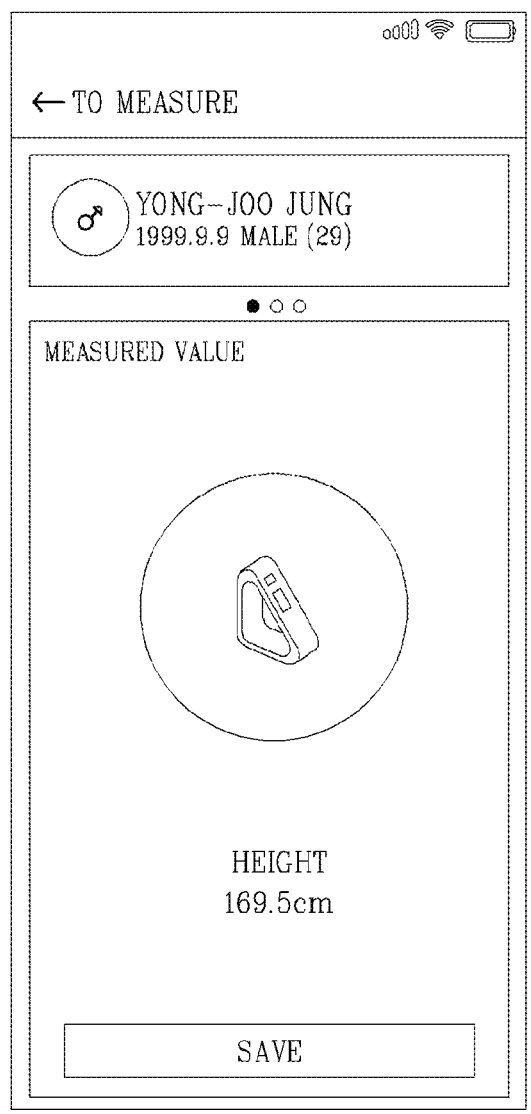

FIG. 21 shows an example of displaying a height measurement result according to embodiments.

Figure 22:
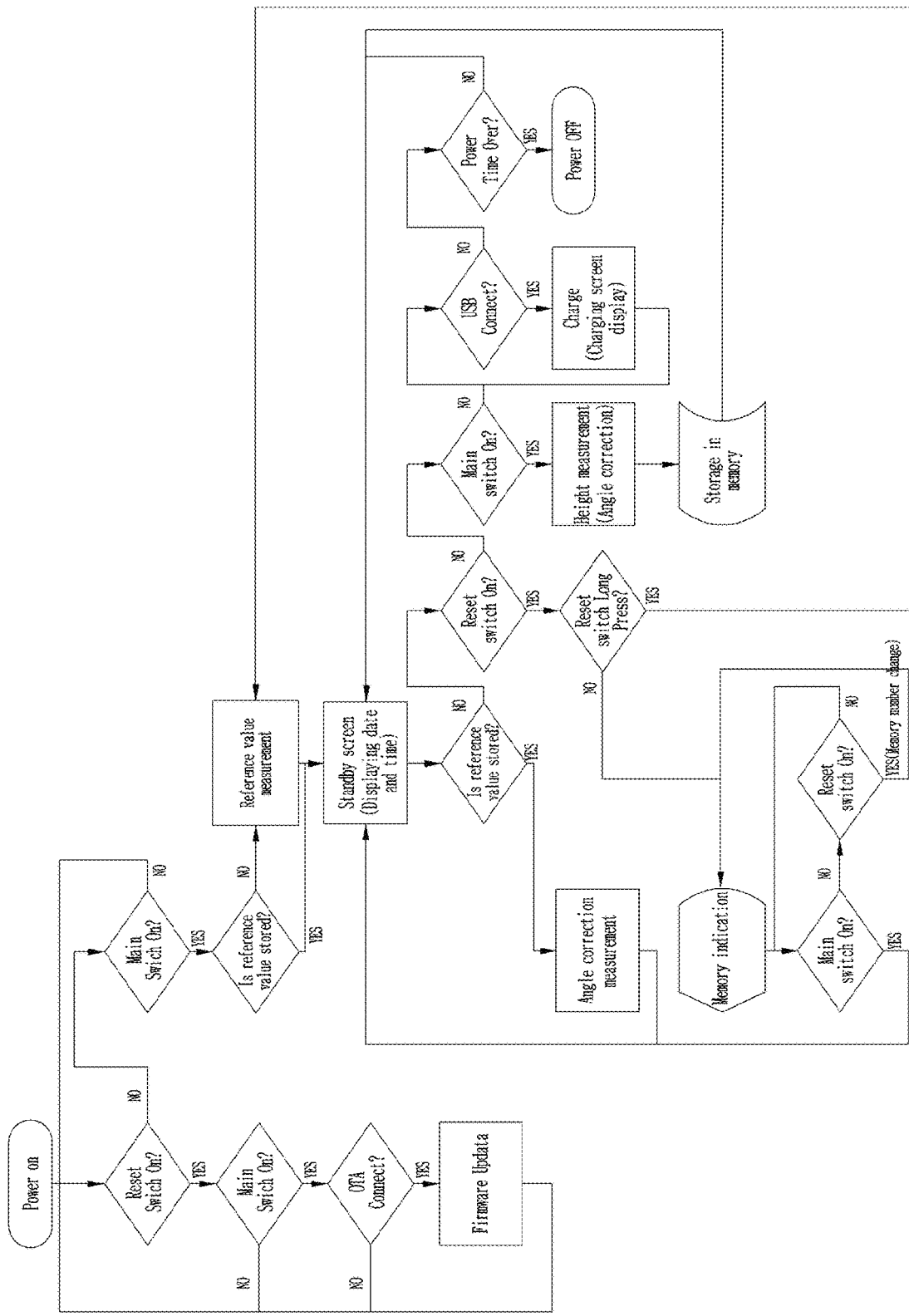

FIG. 22 shows a height measurement flowchart according to embodiments.

Figure 23:
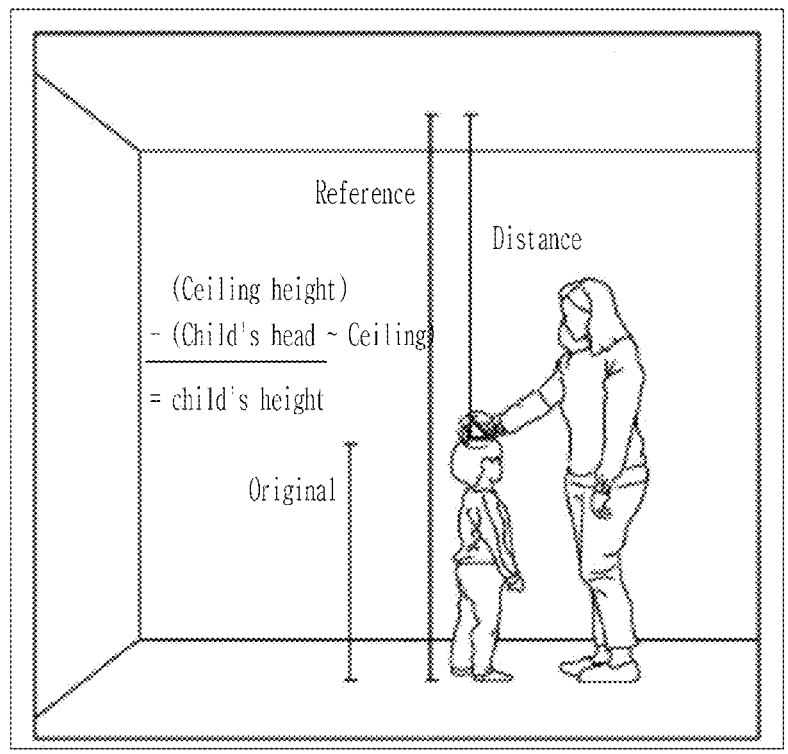
Figure 23:
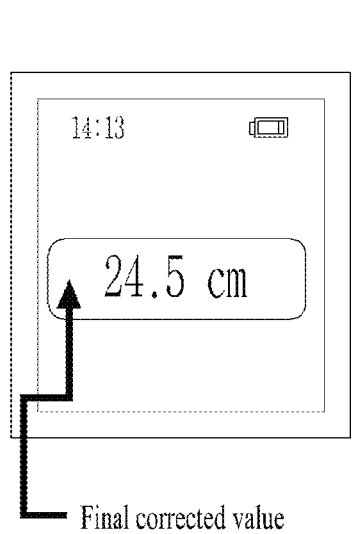
Figure 23:
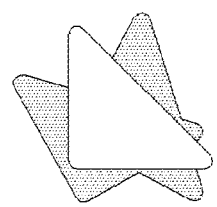
Figure 23:
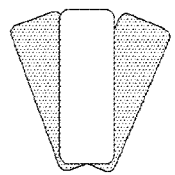

FIG. 23 shows an example of reference distance setting and angle correction according to embodiments.

Figure 24:
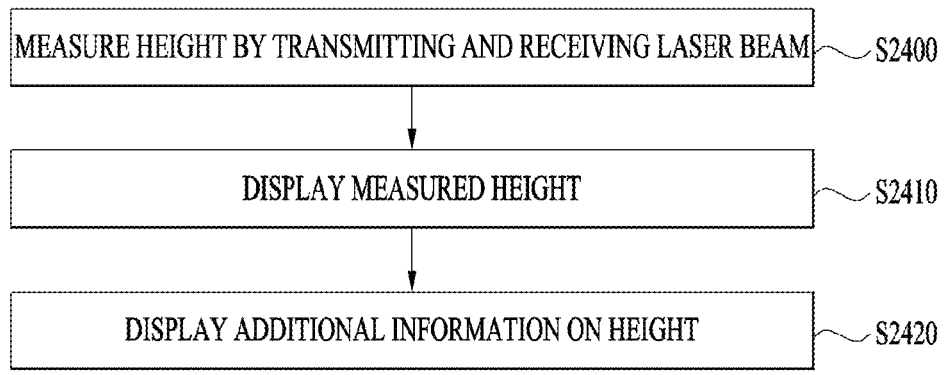

FIG. 24 shows a height measuring method according to embodiments.

DESCRIPTION OF SPECIFIC EMBODIMENTS

Advantages and features of the present disclosure, and a method for achieving those will become apparent with reference to embodiments described below in detail in conjunction with the accompanying drawings. However, the present disclosure will not be limited to the embodiments disclosed below, but will be implemented in a variety of different forms. The present embodiments are only provided to allow the disclosure of the present disclosure to be complete and to fully inform the scope of the invention to those of ordinary skill in the technical field to which the present disclosure belongs. The present disclosure is only defined by the scope of the claims. In connection with the description of the drawings, like reference numerals may be used for like components.

Herein, expressions such as "has", "may have", "includes", or "may include" indicate a presence of a corresponding feature (e.g., a numerical value, a function, an operation, or a component such as a part), and do not exclude a presence of an additional feature.

Herein, expressions such as "A or B", "at least one of A or/and B", or "one or more of A or/and B" may include all possible combinations of the items listed together. For example, the "A or B", the "at least one of A and B", or the "at least one of A or B" may mean all of (1) a case including at least one A, (2) a case including at least one B, and (3) a case including both of the at least one A and the at least one B.

Expressions such as "1st", "2nd", "first", or "second" used herein are able to modify various components, regardless of an order and/or an importance, are used only to distinguish one component from other components, and do not limit the corresponding components. For example, a first user device and a second user device may represent different user devices regardless of the order or the importance. For example, without departing from the scope of the rights described herein, a first component may be named as a second component, and similarly, the second component may also be renamed as the first component.

When it is mentioned that one component (e.g., the first component) is "operatively or communicatively coupled with/to" or "connected to" another component (e.g., the second component), it should be understood that said one component may be directly connected to said another component or may be connected to said another component via still another component (e.g., a third component). On the other hand, when it is mentioned that one component (e.g., the first component) is "directly connected" or "directly coupled" to another component (e.g., the second component), it may be understood that still another component (e.g., the third component) does not exist between said one component and said another component.

As used herein, an expression "configured to (or configured to)" may be used interchangeably with, for example, "suitable for", "having the capacity to", "designed to", "adapted to", "made to", or "capable of". The term "configured to" may not necessarily mean only "specifically designed to" in hardware. Instead, in some circumstances, an expression "a device configured to ~" may mean that the device is "capable of ~" with other devices or components. For example, a phrase "a processor configured to perform A, B, and C" may mean a dedicated processor (e.g., an embedded processor) for performing the corresponding operations, or a generic-purpose processor (e.g., a CPU or an application processor) capable of performing the corresponding operations by executing one or more software programs stored in a memory device.

The terms used herein, which are used only to illustrate a specific embodiment, may not be intended to limit the scope of another embodiment. A singular expression may include a plural expression unless the context clearly dictates otherwise. Terms used herein, including technical or scientific terms, may have the same meanings as those commonly understood by one of ordinary skill in the art described herein. Among the terms used herein, terms defined in a general dictionary may be interpreted to have meanings the same as or similar to meanings in the context of the related art. The terms will not be interpreted in an idealized or overly formal sense unless expressly so defined herein. In some cases, even terms defined herein are not able to be construed to exclude embodiments herein.

Features of several embodiments of the present disclosure may be partially or entirely coupled with or combined with each other, and may be in association with each other and be operated in various technical manners as those skilled in the art may fully understand. Embodiments may be practicable independently of each other or may be practicable together in association with each other.

For clarity of interpretation of the present specification, the terms used herein will be defined below.

Figure 1:
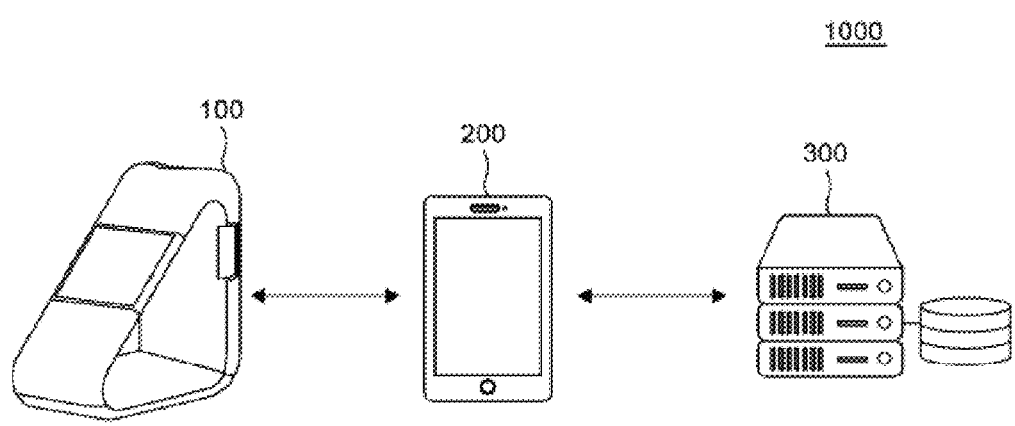
FIG. 1 is a schematic diagram of a height management system according to an embodiment of the present disclosure.

FIG. 1 is a schematic diagram of a height management system according to an embodiment of the present disclosure.

Referring to FIG. 1, a height management system 1000 according to an embodiment of the present disclosure may include a smart height measuring device 100, a user device 200, and a height management server 300.

The smart height measuring device 100 as a device seated on a top face of an object to calculate a vertical dimension of the object may be a small portable electronic device. The smart height measuring device 100 may deviate from an existing scheme that the vertical dimension of the object should be measured from a floor surface, and may calculate the vertical dimension of the object inversely using a height of a space where the object is placed. For example, when the object is a person, a person's height may be calculated by placing the smart height measuring device 100 on a person's head, measuring a vertical distance to a ceiling surface of an indoor space where the person is standing, and subtracting the measured vertical distance from the height of the indoor space. For another example, the person's height may be calculated by placing the smart height measuring device 100 on the person's head, measuring a horizontal distance from the device to a structure above the head in a space where the person is lying, and subtracting the measured vertical distance from a current horizontal distance from a toe or a sole of the person to the structure. However, hereinafter, for convenience of illustration, it is assumed that the vertical dimension of the standing object is calculated.

The user device 200 as a device possessed by a user who acquires the vertical dimension of the object via the smart height measuring device 100 and acquires information based on the acquired vertical dimension may include various electronic devices, such as a PC, a tablet PC, and a smart phone, capable of communication. For example, the user device 200 may be possessed by the user who wants to measure a height thereof via the smart height measuring device 100 and acquire growth management information based on the measured height. Accordingly, the height of the user calculated via the smart height measuring device 100 may be output on the user device 200, and the user device 200 may periodically transmit a height measurement notification to the smart height measuring device 100.

According to an embodiment, the user device 200 may provide a reference distance value of the space where the object is located such that the smart height measuring device 100 may calculate the vertical dimension of the object. For example, when it is desired to measure heights of several people in one space, the user device 200 may provide the ceiling height of the space to the smart height measuring device 100.

The height management server 300 as a server operated by a business operator that collects vertical dimensions of various objects via a plurality of smart height measuring devices 100 and provides various analysis information based on the collected data may include various electronic devices such as a PC, a tablet PC, and a data server.

According to an embodiment, the height management server 300 may collect height data of a plurality of users, may collect weight data, body fat data, skeletal muscle mass data, body water data, and the like of the plurality of users via a separate device, and may provide information for growth management based on a gender and an age based on the collected data. In addition, the information for the growth management may be provided periodically on a yearly and monthly basis, and may be provided to the individual smart height measuring device 100 or to the user device 200 depending on a scheme of use of the smart height measuring device 100.

Up to now, the height management system 1000 according to an embodiment of the present disclosure has been described. According to the present disclosure, the user may easily measure the vertical dimension of the object via the small portable smart height measuring device 100. When the object is the person, the height of the person may be measured easily and accurately. In addition, the height management server 300 may secure big data for information provision by collecting the height data of the plurality of users from the plurality of smart height measuring devices 100, Therefore, the user may receive information necessary for the growth management without going through an individual consultation with a professional manpower.

Hereinafter, the smart height measuring device 100 for measuring the vertical dimension of the object will be described in detail.

Figure 2:
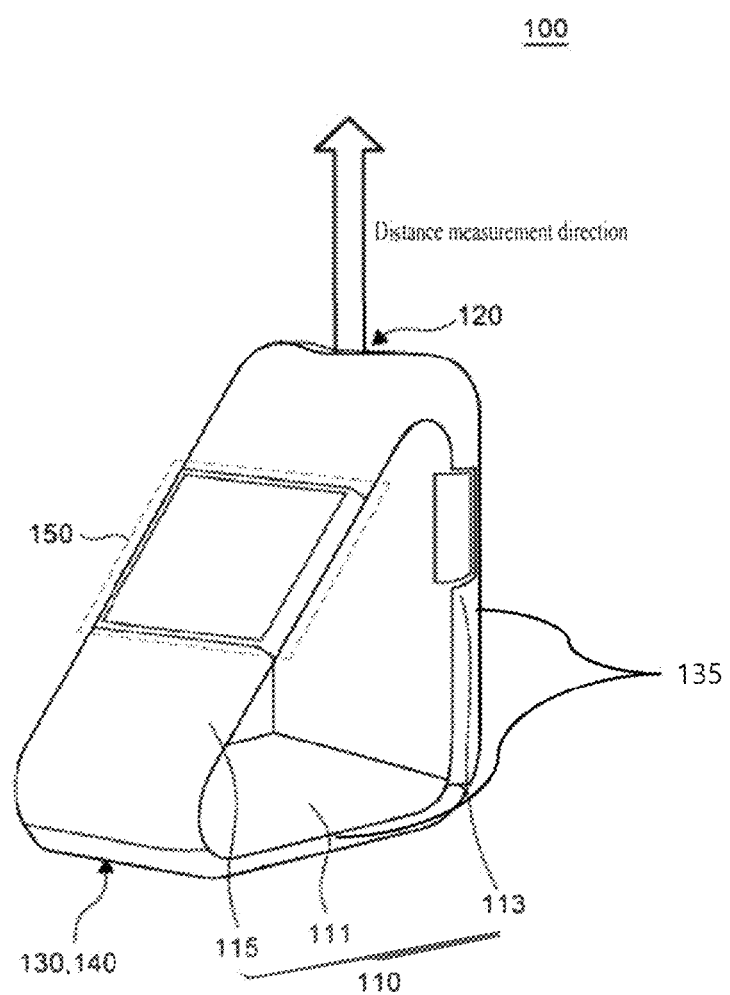
FIG. 2 is a schematic diagram illustratively showing a smart height measuring device according to an embodiment of the present disclosure.

FIG. 2 is a schematic diagram illustratively showing a smart height measuring device according to an embodiment of the present disclosure, and (a) to (c) in FIG. 3 are schematic diagrams illustratively showing smart height measuring devices according to other embodiments of the present disclosure.

First, referring to FIG. 2, the smart height measuring device 100 as a device for measuring the vertical dimension of the object may measure a dimension in a vertical direction based on a floor surface on which the object is seated. In terms of physical components, the smart height measuring device 100 may include a body 110, distance measuring means 120, a power supply 130, a controller 140, and output means 150.

The body 110 may include a bottom portion 111 through which the device is seated, and may have a triangular cross-section when viewed from the side. As described above, the smart height measuring device 100 is configured to measure the vertical dimension of the object by being seated on the floor surface. Therefore, a support 113 for the device for measuring the vertical dimension to be seated may be disposed in a direction perpendicular to the bottom portion 111.

According to an embodiment, in the body 110, the bottom portion 111 and the support 113 may be coupled to each other at one end, and an inclined portion 115 for connecting the opposite ends of the bottom portion 111 and the support 113 to each other may be disposed to stably construct the device. Accordingly, the body 110 may have the triangular cross-section viewed from the side, the bottom portion 111 may constitute a base of the triangle, and the support 113 disposed perpendicular to the bottom portion 111 may constitute a height of the triangle.

However, a shape of the body 110 is not limited to the right triangle as in the above example, and is able to have any type of shape as long as the cross-section viewed from the side includes a flat shape for allowing the body 110 to be seated on the floor surface.

Referring to (a) to (c) in FIG. 3, in addition to a shape having a certain curve or length, such as a triangular prism, a cylinder, and a cube, the body 110 may be in a form of an oval column with a flat but round bottom face as shown in (a) in FIG. 3, may be in a form with a center of gravity biased downward as shown in (b) in FIG. 3, or may be in a form of a crown as shown (c) in FIG. 3. In addition, the output means 150 capable of visually or aurally indicating the vertical dimension of the object may be exposed in one region of the body 110.

Referring back to FIG. 2, the distance measuring means 120 may be disposed in a corner region of the triangular body 110 to measure a distance in an upward direction perpendicular to the bottom portion 111. Specifically, the distance measuring means 120 may measure a vertical distance from a top face of the object to a structure existing in a region upwardly of the object.

According to an embodiment, the distance measuring means 120 may be a laser sensor including a pair of light emitter (a laser beam transmitter) and light receiver (a laser beam receiver), and may measure the vertical distance from the top face of the object to a bottom face of the structure using an arrival time of reflected light reflected from the bottom face of the structure via the laser sensor. In addition, the distance measuring means 120 may be a radar that measures the vertical distance using a radio wave, or may include various non-contact sensors such as an ultrasonic sensor that uses a sound wave, a camera sensor (a ToF sensor and a vision sensor) that uses visible light and an image, and the like.

The power supply 130 may be disposed inside the body 110, and may supply power to the distance measuring means 120, the controller 140, and the output means 150. According to an embodiment, the power supply 130 may be a battery that is built in the body 110 and is able to be charged.

In this regard, the battery is charged in a contactless scheme with an induction coil inside, or is charged by removing the battery from the body 110 and installing the battery in a separate charging device, or is connected to an external terminal on the body 110 It may be charged by being provided with a connectable port.

According to an embodiment, the distance measuring means 120 may be operated by receiving the power from the power supply 130. Therefore, a switch for supplying the power to the distance measuring means 120 may be disposed in one region of the body 110. For example, a button 135 for sensing a physical input may be disposed on a bottom face of the bottom portion 111. Accordingly, the vertical distance between the object and the structure may be measured by allowing the smart height measuring device 100 to be seated on the top face of the object by applying a predetermined pressure to the device 100. For another example, the button 135 may be disposed on an outer face of the support 113, and the user may measure the vertical distance between the object and the structure by pressing the button 135 while holding the smart height measuring device 100 in a hand. However, in addition to such physical input scheme, the button 135 may be implemented in a form capable of receiving various inputs from the user, such as a capacitive touch input, an input using wireless communication, and the like.

In addition, a sensor (not shown) for sensing whether the device is properly seated on the top face of the object may be further included on the bottom face of the bottom portion 111. For example, a touch sensor may be inserted into the bottom face of the bottom portion 111.

For another example, a switch for supplying the power to the distance measuring means 120 may be equipped in an application installed in the user device 200. The user may measure the vertical distance between the object and the structure by manipulating the user device 200 after seating the smart height measuring device 100 on the top face of the object.

The controller 140 may correspond to a computing device such as a central processing unit (CPU) or an application processor (AP). In addition, the controller 140 may be implemented in a form of an integrated chip (IC) such as a system on chip (SoC) in which various computing devices are integrated with each other.

According to an embodiment, the controller 140 may determine the vertical dimension of the object by subtracting the vertical distance measured by the distance measuring means 120 from the reference distance. A more detailed description of a function performed by the controller 140 will be made later.

The output means 150 may output the vertical dimension of the object calculated by the controller 140. According to an embodiment, the output means 150 may be disposed in a region of the inclined portion 115 of the triangular body 110 so as to visually output the vertical dimension of the object, and may further include an audio output device (not shown) so as to aurally output the vertical dimension of the object.

In addition, the smart height measuring device 100 may not have the output means 150. In this case, the vertical dimension of the object calculated by the controller 140 may be output via the user device 200.

FIG. 4 is a block diagram showing a configuration of a smart height measuring device according to an embodiment of the present disclosure.

Referring to FIG. 4, the smart height measuring device 100 may include communication means 101, storage 102, input means 103, a controller 104, output means 105, and distance measuring means 120. The device 100 may further include an additional component for achieving the purpose of the present disclosure, or, when necessary, the above-described component may be formed as a component separate from the device.

The communication means 101 may exchange data with the user device 200 and the height management server 300 via a wired/wireless network. For example, the communication means 101 may receive reference distance information for calculating the vertical dimension of the object from the user device 200 or the height management server 300, and may transmit the vertical dimension of the object to the user device 200 or the height management server 300.

In addition, the communication means 101 may transmit identification information of the object together with an identification number of the smart height measuring device 100 in the process of transmitting the vertical dimension of the object to the height management server 300.

The storage 102 may store various data for calculating the vertical dimension of the object. According to an embodiment, the storage 102 may store data on the reference distance, which is essential information for determining the vertical dimension of the object, and the stored data may be deleted based on the preset number of calculations. For example, when the user who possesses the smart height measuring device 100 wants to measure heights of 10 users, the reference distance stored in the storage 102 may be deleted after 10 calculations are completed. In addition, the storage 102 may store the information on the reference distance without the predetermined number of times, and delete the existing reference distance data when acquiring new reference distance information or receiving a user's deletion request.

In one example, the storage 102 may store identification information of the smart height measuring device 100, information on the user device 200 in association with the device 100, and user identification information. In this regard, the user identification information may include a gender, an age, height data for each year/month/day, and the like of the user who wants to measure the height via the smart height measuring device 100.

In addition, the storage 102 may store vertical dimension data of the smart height measuring device 100 and mathematical equation data for correcting an error of the device. In this regard, a vertical dimension data of the device itself may be utilized to calculate the reference distance of the object based on the scheme with which the reference distance is acquired.

In various embodiments, the storage 102 may include a volatile or non-volatile recording medium capable of storing various data, instructions, and information. For example, the storage 102 may include at least one type of storage media of a flash memory type, a hard disk type, a multimedia card micro type, a card-type memory (SD and XD memories and the like), a RAM, a SRAM, a ROM, an EEPROM, a PROM, a network storage, a cloud, and a block chain database.

In addition, commands for the operation of the smart height measuring device 100 may be recorded in the storage 102. In various embodiments, an application (not shown) for calculating the vertical dimension of the object may be recorded in the storage 102.

The input means 103 may receive various setting data from the user. For example, the input means 103 may receive, from the user, data on the reference distance of the space where the object is to be measured and the number of times to use the reference distance. When there are a plurality of objects, the identification information and order information of the objects may be input.

The output means 105 may output the various data measured via the device. According to an embodiment, the output means 105 may output the vertical dimension data of the object, and may output the identification information of the user and the growth management data received from the height management server 300 when the object is the person. For example, the output means 105 may output the height data calculated via the controller 104 together with the identification information of the user, such as "Gil-dong Hong, 14 years old, male, height 165 cm".

The output means 105 may receive the touch input of the user. In this case, the input means 103 and the output means 105 may be formed as one physical component. Accordingly, the output means 105 may include various sensing means capable of recognizing various inputs generated in a region for displaying an image.

According to an embodiment, when the smart height measuring device 100 and the user device 200 operate in connection with each other, the functions of the input means 103 and the output means 105 may be performed by the user device 200. For example, the smart height measuring device 100 may measure the vertical distance between the object and the structure based on a measurement signal transmitted from the user device 200, and the communication means 101 may transmit the measured value to the user device 200. The controller 104 may be operatively connected with the communication means 101, the storage 102, the input means 103, and the output means 105 to control the overall operations of the smart height measuring device 100. Various commands may be executed to calculate the vertical dimension of the object by running the application or a program stored in the storage 102.

According to an embodiment, the controller 104 may identify whether the user will use the reference distance currently stored in the storage 102 via the input means 103 before calculating the vertical dimension of the object. When it is identified that the user will use the reference distance stored in the storage 102, the controller 104 may perform a series of operations for calculating the vertical dimension of the object. Conversely, when it is identified that the user will not use the reference distance stored in the storage 102, the controller 104 may identify whether the user will measure the reference distance or directly input the reference distance via the input means 103. Accordingly, when the reference distance is to be measured, the controller 104 may determine a vertical distance measured in a state in which the device is seated on the floor as the reference distance based on the manipulation of the user.

After setting the reference distance in various schemes, the controller 104 may, based on the manipulation of the user, identify that the device is seated on the top face of the object, measure the vertical distance between the object and the structure via the distance measuring means 120, and subtract the vertical distance from the reference distance and determine a value obtained by the subtraction as the vertical dimension of the object. For example, the distance measuring means 120 may be the laser sensor, may be composed of the laser beam transmitter and the laser beam receiver, and may measure the vertical distance between the object and the structure as the laser beam receiver receives the laser beam emitted from the laser beam transmitter and then reflected from a specific object.

In the case of the smart height measuring device 100, because the device itself does not operate in a state of being fixed on the floor, an error may occur in the calculated value when the user does not properly seat the device on the top face of the object. In this regard, "properly seated" means that the bottom portion 111 constituting the device and the floor on which the object is placed are parallel to each other. For example, when the object is the person, the device may not be properly seated on the uneven head.

Accordingly, an angle between the device 100 and the ground may be measured via a sensor (not shown) additionally built in the smart height measuring device 100. The controller 104 may control to output an alarm when the angle has a certain value of +/− (when the device is not disposed parallel to the ground). In this regard, the alarm may include various types of alarms that may be perceived by the user, such as a visual, audible, or vibrating alarm.

In one example, based on setting of the user, the arrangement angle of the device may have a predetermined allowable range (a preset angle range). When the arrangement angle of the device is within the allowable range, the controller 104 may correct the angle of the inclined device as follows along with generation of the alarm.

(a) to (b) in FIG. 5 are schematic diagrams for illustrating a scheme for measuring a vertical distance by a smart height measuring device according to an embodiment of the present disclosure.

Referring to (a) to (b) in FIG. 5, the controller 104 may correct the calculated vertical dimension of the object based on Mathematical Equation 1 below. Here, A' refers to a distance calculated when the device itself is not properly seated on the floor, x° refers to an angle of inclination of the device in a front and rear direction as shown in (a) in FIG. 5, y° refers to an angle of inclination of the device in a left and right direction as shown in (b) in FIG. 5, k refers to the distance from the measurement reference floor surface to a center of the bottom face of the device, and A refers to a vertical distance corrected via the above-described variables and constants. As such, the inclination of the device may be adjusted within approximately +5° range via [Equation 1], and the vertical dimension of the previously calculated object may be corrected based on the corrected value.

$$A = A' \times \cos \times \cos y - k \sin x \quad \text{[Mathematical Equation 1]}$$

According to an embodiment, the controller 104 may correct the vertical dimension of the object via an average calculation method. Specifically, when sensing the user input for a preset time via the button 135, the controller 104 may measure the distance between the bottom face of the structure and the top face of the object multiple times, and individually subtract the distances measured multiple times from the reference distance to calculate an average value of the subtracted values. The controller 104 may determine the calculated average value as the vertical dimension of the object. Even when the user does not properly seat the device on the object, the vertical dimension of the object may be obtained by minimizing an error range.

In addition, the controller 104 may determine a distance having the smallest value among the distances measured multiple times via the distance measuring means 120 as the vertical dimension of the object.

According to another embodiment, the controller 104 may allow the user to properly seat the device on the top face of the object via a vertical correction apparatus (not shown) additionally included in the smart height measuring device 100. For example, the vertical correction apparatus may be a mechanical apparatus such as an actuator, and may seat the device parallel to the ground on the top face of the object generally having a curved shape. So far, the smart height measuring device according to one embodiment of the present disclosure has been described. Hereinafter, a method for measuring the height of the object using the smart height measuring device 100 will be described.

FIG. 6 is a schematic flowchart of a growth management method according to an embodiment of the present disclosure.

Referring to FIG. 6, the smart height measuring device 100 determines the reference distance via the user before calculating the vertical dimension of the object (S110). Specifically, the smart height measuring device 100 may output the reference distance data and identify whether the user will use the reference distance stored in advance.

When it is identified that the user will use the reference distance stored in advance, the smart height measuring device 100 may perform a series of operations for calculating the vertical dimension of the object.

Conversely, when it is identified that the user will not use the reference distance stored in advance, the smart height measuring device 100 may identify whether the user will measure the reference distance or directly input the reference distance.

In this regard, FIG. 7 is a schematic diagram for illustrating a height measurement scheme of a smart height measuring device according to an embodiment of the present disclosure.

Referring to FIG. 7, when the reference distance is newly measured in a situation in which a height of a child is measured indoors, based on the manipulation of the user, the smart height measuring device 100 formed in the triangular shape may be seated on the floor. The smart height measuring device 100 may identify that the device is seated on the floor, measure the vertical distance between the floor surface and the ceiling, and determine the measured vertical distance as a reference distance H1.

On the other hand, when it is identified that the reference distance will be input from the user, the smart height measuring device 100 may determine the distance received from input means equipped in the device itself or from the user device 200 as the reference distance H1 for measuring the vertical dimension of the object.

After S110, the smart height measuring device 100 measures a residual distance between the object and the structure (S120). For example, the structure in FIG. 6 may be the ceiling, and the smart height measuring device 100 may identify that it is seated on the head of the child (User) and measure a residual distance H2 from a tip of the head to the ceiling surface.

In addition, the smart height measuring device 100 may correct the vertical dimension of the object based on [Mathematical Equation 1] below in consideration of the case in which the device is not properly seated on the top face of the object. That is, via [Mathematical Equation 1], the inclination of the device may be adjusted within the approximately ±5° range, and the vertical dimension of the object previously calculated may be corrected based on the corrected inclination value.

$$A = A' \times \cos \times \cos y - k \sin x \quad \text{[Mathematical Equation 1]}$$

Here, A' refers to the distance calculated when the device itself is not properly seated on the floor, x° refers to the angle of inclination of the device in the front and rear direction, y° refers to the angle of inclination of the device in the left and right direction, and k refers to the distance from the measurement reference floor surface to the center of the bottom face of the device.

In addition, the smart height measuring device 100 may correct the vertical dimension of the object via the average calculation method. Specifically, when sensing the user input for a preset time via the button 135, the smart height measuring device 100 may measure the distance between the bottom face of the structure and the top face of the object multiple times, and individually subtract the distances measured multiple times from the reference distance to calculate the average value of the subtracted values. The smart height measuring device 100 may determine the calculated average value as the vertical dimension of the object. Even when the user does not properly seat the device on the object, the vertical dimension of the object may be obtained by minimizing the error range.

After S120, the smart height measuring device 100 may calculate a difference between the reference distance H1 and the residual distance H2, and determine the calculated value as the vertical dimension of the object (S130). According to an embodiment, when receiving the reference distance H1 from the user in S110, the smart height measuring device 100 may subtract a vertical length H3 of the device together with the residual distance H2 from the reference distance H1, and determine the subtracted value as a vertical dimension H4 of the object.

According to another embodiment, when the smart height measuring device 100 measures the reference distance H1 in S110, the vertical length H3 of the device is already excluded from the reference distance H1 and the residual distance H2. Therefore, a "reference distance H1−residual distance H2" value may be determined as the vertical dimension H4 of the object.

After S130, the smart height measuring device 100 provides the determined vertical dimension H4 via the output means (S140). For example, when the smart height measuring device 100 is equipped with the visual or auditory output device, the vertical dimension H4 may be output visually/aurally, and the vertical dimension H4 may also be output via the user device 200.

In addition, the vertical dimension H4 determined in S140 may be transmitted to the height management server 300, and the smart height measuring device 100 may receive the data for the growth management of the object (the child) from the height management server 300.

So far, the growth management method according to one embodiment of the present disclosure has been described. According to the present disclosure, the height of the user measured via the smart height measuring device 100 is automatically recorded, and the management method of the growth period based on the height of the user is provided to the user, so that the user may enjoy services such as one-on-one consulting provided by a growth management expert.

Although embodiments of the present disclosure have been described in more detail with reference to the accompanying drawings above, the present disclosure is not necessarily limited to such embodiments, and various modifications may be made within the scope that does not depart from the technical spirit of the present disclosure. Therefore, the embodiments disclosed in the present disclosure are for illustrating rather than limiting the technical idea of the present disclosure, and the scope of the technical idea of the present disclosure is not limited by such embodiments. Therefore, it should be understood that the embodiments described above are illustrative in all respects and not restrictive. The scope of protection of the present disclosure should be interpreted by the claims below, and all technical ideas within the scope equivalent thereto should be interpreted as being included in the scope of the present disclosure.

The smart height measuring device according to the embodiments may be referred to as a height measuring device.

FIG. 8 shows a height measuring device according to embodiments.

FIG. 8 shows the controller 150 shown in FIG. 2. The controller 150 according to the embodiments may be referred to as a display 800. The display 800 may display the data processed by the height measuring device and information on the data for the user.

For example, the display 800 may display time information, date information, and/or information on a state of the height measuring device. The information on the state of the height measuring device according to the embodiments may include remaining battery power display information of the device. Furthermore, the information on the state according to the embodiments may further include information indicating whether the device may operate normally and/or information on a connection state between the device and the user device 200. The user device 200 according to the embodiments may be a second device capable of being in communication with the height measuring device, such as a mobile terminal, a tablet PC, a PC, and the like.

In addition, the display 800 may display guide information on a method for controlling the height measuring device.

In addition, the display 800 may receive a signal from the user in a wired and/or wireless manner. For example, the display 800 may be implemented as a touch screen to directly receive a device-related control signal from the user.

According to embodiments, the information displayed by the display 800 may be provided to the user in a form of UI/UX.

FIG. 9 shows a height measuring device according to embodiments.

FIG. 9 shows the distance measuring means 120 shown in FIG. 2. The distance measuring means 120 according to the embodiments may be referred to as a laser device 120. The laser device 120 according to the embodiments may be the laser sensor including the pair of light emitter (the laser beam transmitter) and light receiver (the laser beam receiver). Using the arrival time of the reflected light reflected from the bottom face of the structure via the laser sensor, the vertical distance from the top face of the object to the bottom face of the structure may be measured. In addition, the distance measuring means 120 may be the radar that measures the vertical distance using the radio wave, or may include the various non-contact sensors such as the ultrasonic sensor that uses the sound wave, the camera sensor (the ToF sensor and the vision sensor) that uses visible light and the image, and the like.

Referring to FIGS. 2 and 10, the height measuring device according to the embodiments may transmit and receive the laser beam in a direction perpendicular to the body 110 in order to measure the distance between the object and the height measuring device. The laser device 120 may be located at one of vertices forming the base, the height, and a hypotenuse of the triangle of the height measuring device. For example, when the laser device 120 is disposed in a height direction, the laser device 120 may accurately receive and transmit the laser beam while being remained parallel to and perpendicular to the height and the base of the body 110.

The laser beam transmitter of the laser device 120 according to the embodiments may emit a visible laser beam having a specific color in order to visually indicate a laser beam transmission path. For example, the laser beam may be visually indicated as a red dot, so that the user of the height measuring device may properly adjust the body 110 of the height measuring device while checking a presence and a location of the red dot on a surface of the object. For example, when the user using the height measuring device is an infant, in order to protect the user from inexperienced use of the user, the laser beam irradiation of the laser beam transmitter may be blocked or the laser device 120 may further include an outer cover.

FIG. 10 shows a height measuring device according to embodiments.

FIG. 10 shows a power supply 10000 and a switch 10010 that may be located in at least one region of the bottom portion 111, the support 113, and/or the inclined portion 115 of the height measuring device shown in FIG. 2.

The power supply 10000 according to the embodiments may refer to the power supply 130 in FIG. 2. Further, according to the embodiments, the power supply 10000 may be located on a side face of at least one of the bottom portion 111, the support 113, and/or the inclined portion 115. The power supply 10000 may further include an outer cover.

The switch 10010 according to the embodiments may be referred to as an auxiliary switch. The auxiliary switch 10010 may activate, deactivate, and control the operation of the height measuring device according to the embodiments. The auxiliary switch 10010 may control the operations of the height measuring device by sensing a physical pressure applied to the region in which the auxiliary switch is disposed. The auxiliary switch 10010 may be implemented in a form capable of receiving the various inputs from the user, such as the capacitive touch input and the input using the wireless communication, in addition to the physical input scheme. The auxiliary switch 10010 may further include an outer cover. A description of the auxiliary switch 10010 for controlling the height measuring operation and additional operations of the height measuring device according to embodiments will be made later with reference to FIGS. 12 to 25.

FIG. 11 shows a height measuring device according to embodiments.

FIG. 11 specifically shows the bottom portion 111 and the body 110 shown in FIG. 2. A bottom portion 11000 in FIG. 11 may correspond to the bottom portion 111 in FIG. 2. The bottom portion 11000 may be connected to a height measuring device 11010. The bottom portion 11000 may be physically connected to the height measuring device 11010. The bottom portion 11000 may be separated while being physically connected to the height measuring device 11010. When the bottom portion 11000 is separated from the height measuring device 11010, a switch 11020 may be disposed in a bottom face of the height measuring device 11010. The switch 11020 according to the embodiments may be referred to as a main switch.

The bottom portion 11000 may include a support plate 11000a that is parallel to the bottom portion and covers the bottom portion. The main switch 11020 may be inserted in a space between the bottom portion 11000 and the support plate 11000a. That is, in an external appearance of the height measuring device 11010, the main switch 11020 may not be visible because of being located inside the device.

The main switch 11020 according to the embodiments may have a push switch form. The main switch 11020 may have various forms for sensing the physical pressure. The main switch 11020 may control the operation of activating the height measurement of the height measuring device. The main switch 11020 may be disposed in one region inside the bottom face of the height measuring device. One face of the height measuring device in which the main switch 11020 is disposed may be perpendicular to one face of the height measuring device with the laser device 120.

The main switch 11020 according to the embodiments may sense the physical pressure by the bottom portion 11000. For example, when the head touches the bottom portion 11000 for the height measurement, the bottom portion 11000 senses the pressure. The bottom portion 11000 may be connected to the height measuring device via a connecting portion 11030. The connecting portion 11030 may connect the bottom portion 11000 and the support plate 11000a to each other.

The connecting portion 11030 may include a hole for guiding a movement of the bottom portion 1100. When the head touches the bottom portion 11000 during the height measurement, the bottom portion 11030 may move along the connecting portion, and may apply a pressure to the main switch 11020.

The height measuring device according to the embodiments may be used in a portable manner without environmental restrictions such as homes, hospitals, and offices, and may easily and accurately measure a height of an adult or the infant. To accurately measure the height, a distance between the head and the ceiling surface must be measured without the error. As the height measuring device has the main switch 11020 inside the bottom face of the height measuring device (between 11010 and 11000), the height may be accurately measured even when one region of the head does not exactly touch the main switch 11020. As a pressure of the head is applied to one region of the bottom portion 11000 that is perpendicular to the direction of the laser beam irradiated from the laser device 120, the bottom portion 11000 may accurately guide the pressure to the main switch 11020 via the connecting portion 11030.

Referring to FIG. 11, the height measuring device according to the embodiments may include: an inclined portion 11040 including the display 150 or 800; a bottom portion 11000 connected to the inclined portion 11040; a support 11050 vertically connected to the bottom portion 11000; and the laser device 120 disposed in a region 11060 where the inclined portion 11040 and the support 11050 meet each other. The inclined portion 11040, the bottom portion 11000, and the support 11050 may be connected to each other based on the shape of the right triangle when viewed from the side. The bottom portion 11000 may include the support plate 11000a for covering the bottom portion 11000, and may include the switch 11020 between the bottom portion 11000 and the support plate 11000a.

Referring to FIGS. 2, 9, and 11, when the pressure is applied to the support plate 11000a, the support plate 11000a may transmit the pressure to the switch 11020, so that the laser device 120 may transmit the laser beam for the height measurement.

The pressure reception of the switch 11020 according to the embodiments may mean a signal input via at least one of the main switch 11020, the auxiliary switch 10010, the display 150, and/or the user device 200.

Referring to FIG. 11, the height measuring device according to the embodiments may include: the inclined portion including the display; the bottom portion connected to the inclined portion; the support vertically connected to the bottom portion; and the laser device disposed in the region where the inclined portion and the support meet each other. The inclined portion, the bottom portion, and the support may be connected to each other based on the shape of the right triangle when viewed from the side. The bottom portion may include the support plate for covering the bottom portion, and may include the switch between the bottom portion and the support plate.

In addition, when the pressure is applied to the support plate when measuring the height, the support plate transmits the pressure to the switch, so that the laser device may transmit the laser beam for measuring the height.

FIG. 12 shows output means of a height measuring device according to embodiments.

The output means 150 in FIG. 12 specifically represents the output means 150 in FIG. 2. The output means 150 according to the embodiments may be referred to as the display.

In the height measuring device according to the embodiments, the power may be on based on at least one of the main switch 11020 and/or the auxiliary switch 10010. In addition to the physical input scheme applied to the main switch 11020 and the auxiliary switch 10010, the height measuring device may be powered on based on the various input types, such as the capacitive touch input and the input using the wireless communication. The height measuring device may be powered on based on the pressure of touching the display 150. The height measuring device may be powered on by receiving a wireless signal by the user device 200 according to the embodiments. The user device 200 according to the embodiments may further include a secondary device capable of data communication with the height measuring device, such as the mobile device and the tablet PC.

When the height measuring device is powered on, the display 150 may display guide information 12000 for the height measurement for the user. The guide information 12000 may represent position of the height measuring device on the head. The user may view the guide information 12000 and prepare for the height measurement. The guide information 12000 may display current time information, current remaining battery power information, and the like. The guide information 12000 may display information on whether the height measuring device maintains the horizontal and vertical state on the head. The guide information 12000 may display information in a form of text, a symbol, a picture, an icon, the UI/UX, and the like.

FIG. 13 shows output means of a height measuring device according to embodiments.

FIG. 13 shows information 13000 as a result of the height measurement by the height measuring device according to the embodiments. The result information 13000 may include the measured height value. As described with reference to FIGS. 6 to 7 and the like, when the main switch 11020 senses the pressure via the bottom portion 11000, the laser device 120 transmits the laser beam to the object (e.g., the ceiling), and receives the reflected laser beam. The height measuring device may store the reference distance value. The height measuring device may display the height value obtained from the difference between the set reference distance value and the residual distance on the display 150 as the result information 13000.

The result information 13000 according to the embodiments may additionally display additional information related to the height measurement. The additional information according to the embodiments may be displayed on the display 150 according to the embodiments, or may be omitted. The additional information may contain inclined angles (X, Y) of the height measuring device, a set reference distance value (Reference), a residual distance (Distance), and the like. Parameters related to the additional information will be described later in FIG. 24 and the like.

The result information 13000 may display the information in the form of the text, the symbol, the picture, the icon, the UI/UX, and the like.

Referring to FIGS. 8, 12, and 13, the height measuring device according to the embodiments may further include the controller 150 for controlling the height measurement. The controller 150 may mean a processor connected to the display 150. The processor may be disposed inside the height measuring device according to the embodiments. For example, the processor may be disposed in at least one region of the inclined portion 11040, the bottom portion 11000, and/or the support 11050. The display 150 may display standby state information for the height measurement. When the pressure is transmitted to the switch 11020, the display 150 may display guide information for the height measurement. When the pressure is transmitted to the switch 11020 while the guide information for the height measurement is displayed, the controller (the processor) may perform the height measurement and correct the height measurement result, and the display 150 may display the corrected result.

The pressure reception of the switch 11020 according to the embodiments may mean a signal input via at least one of the main switch 11020, the auxiliary switch 10010, the display 150, and/or the user device 200.

Referring to FIGS. 8 and 12 to 13, the height measuring device according to the embodiments may further include the controller for controlling the height measurement. The display may display standby state information for the height measurement. When the pressure is transmitted to the switch, the display may display guide information for the height measurement. When the pressure is transmitted to the switch while the guide information for the height measurement is displayed, the controller may perform the height measurement and correct the height measurement result, and the display may display the corrected result.

FIG. 14 shows data recording of a height measuring device according to embodiments.

FIG. 14 shows an example of storing and managing the height data measured in FIG. 13 and the like. The height measuring device may manage and display a stored record of the height measurement data. The height measuring device may display data from recently measured height data 14000 to previously measured height data 14010. The number of height data displayed in the data record may vary depending on setting. The height measuring device may provide a height record for a specific user via the data record. The height measuring device may provide a height record for each user to each of the plurality of users via the data record.

The data record may display the information in the form of the text, the symbol, the picture, the icon, the UI/UX, and the like.

Referring to FIG. 14, the display 150 may display history information of the height data acquired via the height measurement, and the history information may be displayed for each user.

FIG. 15 shows an example of a measurement of a reference distance of a height measuring device according to embodiments.

FIG. 15 shows a process of measuring the reference distance shown in FIGS. 6 to 7 and the like.

The height measuring device may perform a mode of measuring the reference distance when at least one of the main switch 11020 and/or the auxiliary switch 10010 senses a long pressure while the power is on, that is, while in the height measurement standby state. In response to the long pressure input from the user, the height measurement standby mode may be switched to a reference distance measurement mode.

The height measuring device may display that the device is in a state capable of measuring a height of a ceiling of a place where the user measuring the height is located via the display 150. Therefore, a distance from a floor to the ceiling of the space where the user is located, that is, the reference distance may be set.

The height measuring device may display the reference distance mode, and receive a signal activating the laser transmission from at least one of the main switch, the auxiliary switch, the display 150, and/or the user device 200. When a signal activating the reference distance is received, the height measuring device may measure the distance from the floor surface of the space where the body 110 of the height measuring device touches to the ceiling of the space via the laser device 120.

The reference distance according to the embodiments may be displayed on the display 150 as the additional information (Reference) in FIG. 13. After the reference distance is set, the reference distance may be stored in the height measuring device. Based on the set reference distance, the height measuring device may calculate the height data. When the height measuring device does not receive a signal to reset the reference distance, the set reference distance may be used continuously. That is, as long as the space in which the height measuring device is used does not change, the height measuring device may measure the height efficiently and accurately via one height measuring operation.

Data indicating the reference distance mode may be displayed in the form of the text, the symbol, the picture, the icon, the UI/UX, and the like.

Information on the operation and the data of the height measuring device shown in FIGS. 12 to 15 may be displayed on the display of the height measuring device. The information on the operation and the data of the height measuring device shown in FIGS. 12 to 15 may be displayed on the user device 200 connected to the height measuring device in the wired and/or wireless manner. Furthermore, the user device 200 and the secondary device corresponding to the user device may display the height measurement-related information shown in FIGS. 12 to 15.

Referring to FIG. 15, the height measuring device according to the embodiments may receive the signal from the user to set the reference distance, and store the reference distance, and the display 150 may display the guide information for setting the reference distance when receiving the signal from the user.

FIG. 16 is an example of a user interface according to embodiments.

FIG. 16 is an example of a user interface displayed via the display of the height measuring system, for example, the height measuring device 100 and/or the user device 200 according to the embodiments. The user interface includes an icon indicating the height measurement application. The height measurement application according to the embodiments may perform various functions such as control of the operation and/or the function (e.g., power on, power off, the height measuring operation, and the like) of the height measuring device 100 described in FIGS. 1 to 15, height measurement result data management and wired/wireless transmission, and provision of the height measurement result data. The height measurement application according to the embodiments may perform a function in response to the input signal of the user. The user input signal may include a touch input signal via the display or the like of the height measurement system described with reference to FIGS. 1 to 15, a signal via the physical button, and the like. In addition, the height measurement application according to the embodiments may be installed and managed (e.g., updated) in response to the input signal of the user or automatically.

Hereinafter, FIGS. 17 to 21 show an example in which an application displays and controls UI/UX information related to the height measurement.

FIG. 17 shows a configuration for displaying data related to a height measuring device according to embodiments.

FIG. 17 shows an example of the UI/UX information displayed by the height measuring device and/or the application in FIG. 16 and the like.

The height measuring device 100 and the user device 200 according to the embodiments may provide an UX/UI indicating information related to the height measurement and body information and information related to height measuring device control to each display.

A name 17000 may be a name of the height measuring device and the related application according to the embodiments.

User information 17001 may be information on the user of the height measuring device and the application. For example, the user information 17001 may contain a user name, a date of birth, a gender, an age, and the like.

A diagram 17002 may express the body information of the user in a form of a figure, a symbol, a graph, or the like. For example, the diagram 17002 may display distribution of biometric information (fat, protein, muscle, water, and the like) based on a polygonal shape.

A table 17003 may display a history of the body information of the user in a form of a table. For example, the biometric information containing a height, a weight, a BMI, a body fat, a muscle mass, the water, a visceral fat, and/or the protein may be classified into past data and current data based on a time sequence so as to display a degree of change (an increase/a decrease).

A menu 17004 may display a menu related to the operation and the setting of the height measuring device and the application. For example, the menu 17004 may contains menus such as home, growth analysis, diary, growth album, and/or my page. Via the growth analysis, the diary, the growth album, and the like, the height measuring device and the application may manage and analyze the body information, the biometric information, and the like. FIG. 17 may be an example of information constituting the growth analysis menu.

Referring to FIG. 17, a method for measuring the height using the height measuring device according to embodiments in FIG. 11 and the like may include: measuring the height by transmitting and receiving the laser beam; displaying the measured height; and displaying the additional information on the height.

Referring to FIG. 17, the displaying of the additional information on the height according to the embodiments may include analyzing the biometric information of the user based on the measured height, and the analyzing of the biometric information may include analyzing a change of the biometric information based on the height of the user and displaying the change of the biometric information.

FIG. 18 shows a configuration for displaying data related to a height measuring device according to embodiments.

FIG. 18 shows an example of the UI/UX information displayed by the height measuring device and/or the application in FIGS. 16 to 17 and the like.

For example, FIG. 18 may be a configuration of UI/UX information for the home menu in the menu 17004. The height measuring device and the application according to the embodiments may display control information for measuring the biometric information such as the height and/or the weight, information indicating the measurement result, and the like.

The height measuring device and/or the application may display control information and result information related to the height measurement 18000. The height measuring device and/or the application may receive a signal activating the height measurement from the user. The signal for activating the height measurement may be received via a physical pressure via the measurement UI/UX information 18000 and/or the main switch and/or the auxiliary switch of the height measuring device. The height measuring device and/or the application may display the measured height result and/or a measured time. The height measuring device and/or a bioinstrument connected to the application may further measure the biometric information of the user. For example, when measuring the weight, the height measuring device and/or the application may receive a signal for activating the measurement of the biometric information (the weight). The signal for activating the measurement of the biometric information may be received via the physical pressure via measurement UI/UX information 18001 and/or the main switch and/or the auxiliary switch of the height measuring device and/or the bioinstrument. The height measuring device and/or the application may display the measured biometric information (the weight) result and/or a measured time. The measured biometric information and the like may be used as analysis information via the growth analysis and the like of the menu 17004.

The height measuring device and/or the application may control the height measuring device and the measuring method with an electrical signal via the installed application without manipulation of the physical switch of the height measuring device.

The height measuring device and/or the application may provide the stored reference distance information along with the UI/UX information indicating the place as selection option information such that the user may easily select a reference distance for each space via the installed application.

The height measuring device and/or the application may provide, via the installed application, notification information indicating whether the angle correction is required or whether degrees of horizontality/verticality of the device are within a normal operating range when measuring the height.

FIG. 19 shows display of information related to a measuring operation of a height measuring device according to embodiments.

The display 150 of the height measuring device and/or the display of the user device 200 in FIGS. 8 and 12 to 15 may display information for controlling and guiding the measurement as shown in FIG. 19 when measuring the height.

For example, when the measuring operation is activated via the biometric information measurement UI/UX information as shown in FIG. 18 or when the height measuring device receives a measurement start signal via the switch, the height measuring device and/or the application may guide the height measurement as follows.

Operation control information 19000 is UI/UX information for controlling height scan start and/or height scan stop.

Main guide information 19001 may display information for guiding the height measurement (to be described later in FIG. 20 and the like).

Data input information 19002 may provide a function for directly inputting the biometric information such as the height to be additionally stored in the biometric information history.

FIG. 20 shows an example of a height measurement guide according to embodiments.

FIG. 20 shows a UI/UX in which the height measuring device and/or the application described in FIG. 19 and the like guide the operation of the height measuring device.

A guide UI/UX 2000 may be displayed in the UI/UX form to make it easier for the user to know how to measure the height using the height measuring device. For example, additional information such as how to manipulate the height measuring device, how to place the height measuring device on the head of the user when measuring the height, how the laser beam of the height measuring device is transmitted, whether the height measuring device is currently measuring the height or in the standby state, and the like may be displayed visually. The height measuring device and/or the application may further display guide information 2001 related to the height measurement in text, a symbol, a figure, and the like.

The height measuring device and/or the application may provide an additional function that allows the user to select a desired device, such as the height measuring device and the related bioinstrument. Information 2002 for guiding such a device selection function may be further displayed.

Referring to FIG. 20, the measuring of the height according to the embodiments may include displaying the information guiding the operation of the height measuring device for measuring the height, and such information may represent a state in which the user of the height measuring device places the height measuring device on the head thereof.

FIG. 21 shows an example of displaying a height measurement result according to embodiments.

FIG. 21 shows a height measurement result value and UI/UX information related to the result when the height measurement is completed in FIG. 20 and the like.

The height measuring device and/or the application according to the embodiments may display information indicating whether the height measurement has been completed without the error. In addition, the measured result may be further displayed. In addition, information indicative of the device used for the measurement may be further displayed. Information indicating whether to store the measured result or to additionally perform the measurement may be further displayed.

FIG. 22 shows a height measurement flowchart according to embodiments.

The height measuring device according to the embodiments may measure the height based on the flowchart as in FIG. 22. Each operation is illustrated by way of example, and an order change, an omission, a simplification, and the like of the operations are able to be achieved according to the embodiments.

The height measuring device may update firmware as follows. Whether the auxiliary switch is turned on is checked. When the auxiliary switch is turned on, whether the main switch is turned on is checked. When the main switch is turned on, whether an over the air (OTA) controller is in a connected state is checked. When the OTA is connected, the firmware of the height measuring device is updated.

The height measuring device may measure the height as follows. When the main switch is turned on, whether the reference value is stored is checked. When the reference value is not stored or the reference value is newly set, the reference value may be measured. The height measuring device may display a standby screen. The standby screen may display the control related UI/UX, state information, standby information such as a date and a time, and the like of the height measuring device. When using the stored reference value or when the reference value setting is completed, the height measuring device may measure the height. The angle may be corrected when measuring the height. The height measuring device and/or the application may store the measured height data.

The height measuring device may correct the angle for the height measurement as follows. When the main switch and the auxiliary switch of the height measuring device are turned on or when the application and/or the height measuring device receives a signal indicating the angle correction, the angle correction may be measured.

FIG. 23 shows an example of reference distance setting and angle correction according to embodiments.

FIG. 23 shows the reference distance described in FIGS. 6 to 7, 15, and the like and the angle correction described in FIG. 5 and the like.

When the height measuring device according to the embodiments measures the height and calculates the final value, the reference distance (Reference), the residual distance (Distance), and the measured height (original) may be calculated, a final value corrected based on the angle at which the device is inclined may be calculated from the measured height value, and the final corrected value may be displayed as shown in FIG. 23.

According to embodiments, the information displayed on the display may include the final corrected value and/or the additional information. Furthermore, according to embodiments, only the final corrected value may be displayed. The additional information and the like may be omitted.

FIG. 24 shows a height measuring method according to embodiments.

FIG. 6 shows the height measuring method via the reference distance and the residual distance, and FIG. 24 shows a process including a height measuring method or a height analysis method. The method in FIG. 24 may include measuring the height based on the method in FIG. 6. In addition, a method for measuring the height using the reference distance set when determining the reference distance in FIG. 6 may be included. The method in FIG. 24 may be performed by the height measuring device according to the embodiments in FIG. 11 and the like, and may be performed by the application of the user device 200 or the like connected to the height measuring device so as to be able to perform the wireless communication with the height measuring device.

S2400, the height measuring method according to the embodiments may include measuring the height by transmitting and receiving the laser beam. The measuring of the height via the laser beam according to the embodiments may follow the measuring method described in FIGS. 2 and 5 to 7. In addition, the measuring of the height according to the embodiments may further include the standby state display in FIG. 8, the measurement guide display in FIG. 12, the reference distance setting guide display method in FIG. 15, and the like.

S2410, the height measuring method according to the embodiments may further include displaying the measured height. The displaying of the height, which is the measured result, according to the embodiments may further include the angle correction in FIG. 5, the result value correction in FIGS. 22 to 23, and the displaying of the information related to the height in FIGS. 13, 14, 17 to 21, and the like.

S2420, the height measuring method according to the embodiments may further include displaying the additional information on the height. The displaying of the additional information according to the embodiments may further include displaying the height and the biometric information, information for a user convenience, analysis information, and the like in FIGS. 17 to 21 and the like.

Therefore, the height measuring device and the height measuring method according to the embodiments may measure the height of the user simply and accurately because of the components according to the embodiments. Without a complicated configuration, the correct height may be measured by adjusting the device horizontally/vertically using the right triangle model of the device. Even without complicated a usage capability, the height measurement may be activated by applying the pressure to the switch structure located inside the bottom face of the device using the horizontal support plate. Therefore, even when the head does not correctly touch the switch, the correct height may be easily measured at a correct point by the horizontal support plate. Therefore, the height may be easily and accurately measured in spaces with the infants, such as the home, and the hospital. The height measuring device may be connected to the communication network to run the application via the height measuring method. As the UI/UX information is provided via the application, the height measuring device may be easily operated. In addition to the height, the biometric information may be further acquired or the biometric information may be analyzed from the height, and the biometric information may be provided to the user in the form of UI/UX. A health management program may be provided for the user.

The embodiments have been described in terms of the method and/or the device, and the description of the method and the description of the device may be applied complementary to each other.

Although the drawings have been described separately for convenience of description, it may be designed to implement a new embodiment by merging the embodiments described with respect to the respective drawings. In addition, based on needs of those skilled in the art, designing a computer-readable recording medium in which a program for implementing the previously described embodiments is recorded also falls within the scope of the rights of the embodiments. In the device and the method according to the embodiments, the configurations and the methods of the embodiments as described above may not be limitedly applied, and all or some of the embodiments may be selectively combined with each other such that various modifications may be made. Although the preferred embodiment of the embodiments has been shown and described, the embodiments are not limited to the specific embodiment described above, and various modifications are able to be made by those of ordinary skill in the technical field to which the present disclosure pertains without departing from the gist of the embodiments claimed in the claims. In addition, such modifications should not be individually understood from the spirit or perspective of the embodiments.

Various components of the device of the embodiments may be implemented by hardware, software, firmware, or combinations thereof. Various components of the embodiments may be implemented with one chip, for example, one hardware circuit. According to the embodiments, the components according to the embodiments may be implemented with separate chips. According to the embodiments, at least one of the components of the device according to the embodiments may be composed of one or more processors capable of executing one or more programs, and said one or more programs may perform, or include instructions for performing, one or more operations/methods according to the embodiments. The executable instructions for performing the methods/operations of the device according to the embodiments may be stored in a non-transitory CRM or other computer program product to be executed by said one or more processors, or may be stored in a transitory CRM or other computer program product to be executed by said one or more processors. In addition, the memory according to the embodiments may be used as a concept including not only a volatile memory (e.g., a RAM or the like), but also a non-volatile memory, a flash memory, a PROM, and the like. In addition, implementation in a form of a carrier wave, such as transmission via Internet, may be included. In addition, in a processor-readable recording medium, processor-readable codes that may be distributed in a computer system connected via the network and read by the processor may be stored and executed.

Herein, "/" and "," are interpreted as "and/or". For example, "A/B" is interpreted as "A and/or B", and "A, B" is interpreted as "A and/or B". Additionally, "A/B/C" means "at least one of A, B, and/or C". In addition, "A, B, C" also means "at least one of A, B, and/or C". Additionally, herein, "or" is interpreted as "and/or". For example, "A or B" may mean 1) only "A", 2) only "B", or 3) "A and B". In other words, herein, "or" may mean "additionally or alternatively".

Terms such as first, second, and the like may be used to describe various components of the embodiments. However, the interpretation of the various components according to the embodiments should not be limited by the above terms. Such terms are only used to distinguish one component from another. For example, a first user input signal may be referred to as a second user input signal. Similarly, the second user input signal may be referred to as the first user input signal. Use of such terms should be construed as not departing from the scope of the various embodiments. Although the first user input signal and the second user input signal are both user input signals, they do not mean the same user input signal unless the context clearly indicates otherwise.

The terminology used to describe the embodiments is used for the purpose of describing specific embodiments, and is not intended to limit the embodiments. As used in the description of the embodiments and in the claims, a singular expression is intended to include a plural expression unless the context clearly dictates otherwise. The expression of "and/or" is used to have a meaning of including all possible combinations of terms. The expression of "includes" describes that features, numbers, operations, elements, and/or components are present, and does not mean that additional features, numbers, operations, elements, and/or components are not included. Conditional expressions such as "in a case of ~", "when", and the like used to describe the embodiments are not limited only to an optional case. It is intended that, when a specific condition is satisfied, a related operation is performed or a related definition is interpreted in response to the specific condition.

In addition, the operation according to the embodiments described herein may be performed by a transmitting and receiving device including a memory and/or a processor according to the embodiments. The memory may store programs for processing/controlling the operation according to the embodiments, and the processor may control various operations described herein. The processor may be referred to as a controller or the like. The operations according to the embodiments may be performed by firmware, software, and/or a combination thereof, and the firmware, the software, and/or the combination thereof may be stored in the processor or stored in the memory.

In one example, the operation according to the above-described embodiments may be performed by the transmitting device and/or the receiving device according to the embodiments. The transmitting and receiving device may include transmitting and receiving means that transmits and receives media data, a memory that stores instructions (a program code, an algorithm, a flowchart, and/or data) for a process according to the embodiments, and a processor that controls operations of the transmitting device and/or the receiving device.

The processor may be referred to as a controller or the like, and may correspond to, for example, hardware, software, and/or a combination thereof. Operations according to the above-described embodiments may be performed by the processor. In addition, the processor may be implemented as an encoder/decoder or the like for the operation of the above-described embodiments.

What is claimed is:

1. A device for measuring a height, the device comprising:
an inclined portion including a display;
a bottom portion connected to the inclined portion;
a support vertically connected to the bottom portion; and
a laser device disposed in a region where the inclined portion and the support meet each other,
wherein:
the inclined portion, the bottom portion, and the support are connected to each other based on a shape of a right triangle when viewed from a side,
the bottom portion includes a support plate for covering the bottom portion, wherein a switch is included between the bottom portion and the support plate,
when a pressure is applied to the support plate, the support plate transmits the pressure to the switch, so that the laser device transmits a laser beam for the height measurement,
the device further comprises a controller configured to control the height measurement,
the display displays standby state information for the height measurement,
when a pressure is transmitted to the switch, the display displays guide information for the height measurement, and
when the pressure is transmitted to the switch while the guide information for the height measurement is displayed, the controller performs the height measurement and corrects the height measurement result, the display displays the corrected result.

2. The device of claim 1, wherein
the display displays history information of height data acquired via the height measurement, wherein the history information is displayed for each user.

3. The device of claim 1, wherein
a reference distance is set by receiving a signal from a user and the reference distance is stored,
wherein the display displays guide information for the reference distance setting when receiving the signal from the user.

4. A method for measuring a height using the device of claim 1, the method comprising:
displaying standby state information for the height measurement;
displaying guide information for the height measurement when a pressure is applied to the switch;

measuring the height by transmitting and receiving a laser beam when a pressure is applied to the switch while the guide information is displayed;
correcting a measurement result;
displaying the corrected result; and
displaying additional information on the height.

5. The method of claim 4, wherein the guide information represents a state of a user of the device placing the device on a head thereof.

6. The method of claim 4, wherein the displaying of the additional information on the height includes analyzing biometric information of a user based on the measured height,
wherein the analyzing of the biometric information includes analyzing a change in the biometric information based on the height of the user and displaying the change in the biometric information.

7. The method of claim 4, wherein the guide information includes time information and battery power information of the device.

8. The method of claim 4, wherein the guide information includes position information of the device.

9. The method of claim 4, wherein the guide information includes one or more instructions for a user to follow for the height measurement.

10. The device of claim 1, wherein the guide information includes time information and battery power information of the device.

11. The device of claim 1, wherein the guide information includes position information of the device.

12. The device of claim 1, wherein the guide information includes one or more instructions for a user to follow for the height measurement.

* * * * *